(12) United States Patent
Stoler et al.

(10) Patent No.: US 9,729,352 B1
(45) Date of Patent: Aug. 8, 2017

(54) ASSISTING PARTICIPATION IN A SOCIAL NETWORK

(75) Inventors: Brian Stoler, San Mateo, CA (US); Neilfred Picciotto, Santa Clara, CA (US); Joseph M. Rozier, San Jose, CA (US); John A. Costigan, III, Mountain View, CA (US); Todd Jackson, San Francisco, CA (US); Edward S. Ho, Palo Alto, CA (US); Braden F. Kowitz, San Francisco, CA (US); Michael H. Leggett, Mountain View, CA (US); Ari J. Leichtberg, Zichron Yaakov (IL); Keith J. Coleman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1180 days.

(21) Appl. No.: 12/702,124

(22) Filed: Feb. 8, 2010

(51) Int. Cl.
    *H04L 12/58* (2006.01)

(52) U.S. Cl.
    CPC ............ *H04L 12/588* (2013.01); *H04L 51/26* (2013.01); *H04L 51/32* (2013.01)

(58) Field of Classification Search
    CPC ......... H04M 3/567; G06Q 50/01; H04L 51/32
    USPC ................................................ 715/753, 812
    See application file for complete search history.

(56) References Cited

U.S. PATENT DOCUMENTS

| | | | |
|---|---|---|---|
| 6,285,999 B1 | 9/2001 | Page | |
| 6,480,885 B1 * | 11/2002 | Olivier | ........................... 709/207 |
| 7,069,308 B2 | 6/2006 | Abrams | |
| 7,136,915 B2 | 11/2006 | Rieger et al. | |
| 7,593,740 B2 | 9/2009 | Crowley | |
| 7,818,392 B1 | 10/2010 | Martino et al. | |
| 7,840,502 B2 | 11/2010 | Li et al. | |
| 7,873,996 B1 * | 1/2011 | Emigh et al. | ................... 726/22 |

(Continued)

FOREIGN PATENT DOCUMENTS

| | | |
|---|---|---|
| KR | 10-2009-0091854 | 8/2009 |
| WO | 2008/154106 A1 | 12/2008 |

OTHER PUBLICATIONS

Smith, Justin, document entitled "Facebook Now Suggesting Friends Found in Imported Contact Lists?" Jun. 12, 2009, Available at http://www.insidefacebook.com/2009/06/12/facebook-now-suggesting-friends-found-in-imported-contact-lists/ .

(Continued)

*Primary Examiner* — Jeffrey A Gaffin
*Assistant Examiner* — John M Heffington
(74) *Attorney, Agent, or Firm* — IP Spring

(57) ABSTRACT

Methods, systems, and apparatus, including computer programs encoded on a computer storage medium, for assisting participation in a social network. In one aspect, a method is performed by a system of one or more data processing devices. The method includes receiving, at the system, a historical record of message exchange between an individual and members in a member network, the system determining, for each of the members, whether the individual is likely to want to be related to the respective member, each determination considering the number and transactional characteristics of the message exchange between the individual and the respective member in the historical record, and the system outputting the determinations that the individual is likely to want to be related to at least two of the respective members.

19 Claims, 13 Drawing Sheets

(56) References Cited

U.S. PATENT DOCUMENTS

| | | | |
|---|---|---|---|
| 8,214,446 B1 | 7/2012 | Siegel et al. | |
| 8,224,714 B2* | 7/2012 | Yost | 705/26.7 |
| 8,370,062 B1 | 2/2013 | Starenky et al. | |
| 8,413,060 B1* | 4/2013 | Agrawal | 715/753 |
| 8,417,698 B2* | 4/2013 | Yoo | 707/732 |
| 8,417,729 B2* | 4/2013 | Baker | 707/794 |
| 8,474,628 B1* | 7/2013 | Appelman et al. | 209/206 |
| 8,582,801 B2 | 11/2013 | Goto et al. | |
| 2002/0103892 A1 | 8/2002 | Rieger | |
| 2002/0144154 A1* | 10/2002 | Tomkow | 713/201 |
| 2003/0172120 A1* | 9/2003 | Tomkow et al. | 709/206 |
| 2004/0221014 A1* | 11/2004 | Tomkow | 709/206 |
| 2004/0230657 A1* | 11/2004 | Tomkow | 709/206 |
| 2005/0021963 A1* | 1/2005 | Tomkow | 713/171 |
| 2005/0198511 A1* | 9/2005 | Tomkow | 713/176 |
| 2005/0223077 A1* | 10/2005 | Vellanki et al. | 709/207 |
| 2006/0031775 A1* | 2/2006 | Sattler et al. | 715/769 |
| 2006/0252547 A1* | 11/2006 | Mizrahi et al. | 463/42 |
| 2006/0284744 A1 | 12/2006 | Shetland | |
| 2006/0284893 A1* | 12/2006 | Hlad et al. | 345/684 |
| 2006/0294571 A1 | 12/2006 | Moore et al. | |
| 2007/0016651 A1 | 1/2007 | Blagsvedt et al. | |
| 2007/0127555 A1 | 6/2007 | Lynch | |
| 2007/0143416 A1* | 6/2007 | Daigle et al. | 709/206 |
| 2007/0143417 A1* | 6/2007 | Daigle | 709/206 |
| 2007/0143435 A1* | 6/2007 | Daigle et al. | 709/207 |
| 2007/0150368 A1* | 6/2007 | Arora et al. | 705/26 |
| 2007/0174402 A1* | 7/2007 | Tomkow | 709/206 |
| 2007/0242131 A1 | 10/2007 | Sanz-Pastor et al. | |
| 2007/0293253 A1* | 12/2007 | Matsumoto et al. | 455/466 |
| 2008/0005341 A1 | 1/2008 | Subbian | |
| 2008/0022302 A1* | 1/2008 | Tanaka et al. | 725/36 |
| 2008/0098087 A1* | 4/2008 | Lubeck | 709/218 |
| 2008/0188261 A1* | 8/2008 | Arnone | 455/550.1 |
| 2008/0189367 A1* | 8/2008 | Okumura | 709/204 |
| 2008/0215426 A1* | 9/2008 | Guldimann et al. | 705/14 |
| 2008/0222551 A1 | 9/2008 | Takamune | |
| 2008/0227385 A1* | 9/2008 | Bappu et al. | 455/3.06 |
| 2008/0307472 A1* | 12/2008 | Tanaka et al. | 725/102 |
| 2008/0313208 A1 | 12/2008 | Hourselt et al. | |
| 2008/0313256 A1 | 12/2008 | Kanazawa et al. | |
| 2009/0006371 A1 | 1/2009 | Denoue et al. | |
| 2009/0049144 A1* | 2/2009 | Suzuki et al. | 709/206 |
| 2009/0055485 A1* | 2/2009 | Tsai et al. | 709/206 |
| 2009/0070426 A1* | 3/2009 | McCauley et al. | 709/205 |
| 2009/0077182 A1* | 3/2009 | Banjara et al. | 709/206 |
| 2009/0083658 A1* | 3/2009 | Ito et al. | 715/781 |
| 2009/0106697 A1 | 4/2009 | Ward et al. | |
| 2009/0144392 A1 | 6/2009 | Wang et al. | |
| 2009/0164431 A1* | 6/2009 | Zivkovic et al. | 707/3 |
| 2009/0164574 A1* | 6/2009 | Hoffman | 709/204 |
| 2009/0222551 A1 | 9/2009 | Neely et al. | |
| 2009/0259650 A1 | 10/2009 | Schuil et al. | |
| 2009/0265429 A1* | 10/2009 | Gestsson et al. | 709/204 |
| 2009/0271244 A1* | 10/2009 | Kalasapur et al. | 705/10 |
| 2009/0282002 A1* | 11/2009 | Reeder et al. | 707/3 |
| 2009/0291665 A1* | 11/2009 | Gaskarth et al. | 455/405 |
| 2009/0313346 A1* | 12/2009 | Sood | G06Q 10/10 709/207 |
| 2009/0319518 A1 | 12/2009 | Koudas | |
| 2010/0003659 A1 | 1/2010 | Edmonds | 434/350 |
| 2010/0004857 A1 | 1/2010 | Pereira et al. | |
| 2010/0015975 A1* | 1/2010 | Issa et al. | 455/435.1 |
| 2010/0017237 A1* | 1/2010 | Dalesandro et al. | 705/5 |
| 2010/0088187 A1* | 4/2010 | Courtney et al. | 705/14.73 |
| 2010/0106784 A1* | 4/2010 | Wang et al. | 709/206 |
| 2010/0115114 A1* | 5/2010 | Headley | 709/229 |
| 2010/0144323 A1* | 6/2010 | Collins et al. | 455/414.1 |
| 2010/0153404 A1 | 6/2010 | Ghosh et al. | |
| 2010/0169363 A1* | 7/2010 | Gaedcke | 707/769 |
| 2010/0199340 A1* | 8/2010 | Jonas et al. | 726/8 |
| 2010/0205430 A1* | 8/2010 | Chiou et al. | 713/156 |
| 2010/0241964 A1 | 9/2010 | Belinsky et al. | |
| 2010/0268830 A1* | 10/2010 | McKee et al. | 709/228 |
| 2010/0273447 A1* | 10/2010 | Mann et al. | 455/405 |
| 2010/0274792 A1* | 10/2010 | Bhangi | 707/754 |
| 2010/0274815 A1* | 10/2010 | Vanasco | 707/798 |
| 2010/0287033 A1* | 11/2010 | Mathur | 705/10 |
| 2010/0287109 A1* | 11/2010 | Li et al. | 705/319 |
| 2010/0293029 A1* | 11/2010 | Ollinphant | 705/9 |
| 2010/0306099 A1* | 12/2010 | Hirson et al. | 705/38 |
| 2010/0313252 A1* | 12/2010 | Trouw | 726/7 |
| 2010/0323667 A1* | 12/2010 | Oschwald et al. | 455/412.2 |
| 2010/0333019 A1* | 12/2010 | Oschwald et al. | 715/810 |
| 2011/0016179 A1* | 1/2011 | Bechtel | 709/205 |
| 2011/0022602 A1 | 1/2011 | Luo et al. | |
| 2011/0055723 A1 | 3/2011 | Lightstone et al. | |
| 2011/0078190 A1* | 3/2011 | Samuel et al. | 707/780 |
| 2011/0099507 A1 | 4/2011 | Nesladek | |
| 2011/0106857 A1* | 5/2011 | Besombe et al. | 707/803 |
| 2011/0125770 A1* | 5/2011 | Battestini et al. | 707/758 |
| 2011/0154223 A1 | 6/2011 | Whitnah et al. | |
| 2011/0167125 A1 | 7/2011 | Achlioptas | |
| 2011/0196932 A1 | 8/2011 | Jackson et al. | |
| 2011/0196933 A1 | 8/2011 | Jackson et al. | |
| 2011/0212430 A1 | 9/2011 | Smithmier et al. | |
| 2011/0225257 A1 | 9/2011 | Tilden et al. | |
| 2011/0238762 A1 | 9/2011 | Soni et al. | |
| 2011/0264528 A1 | 10/2011 | Whale | |
| 2011/0314111 A1* | 12/2011 | Wang et al. | 709/206 |
| 2012/0042020 A1 | 2/2012 | Kolari et al. | |
| 2012/0066312 A1 | 3/2012 | Kandekar et al. | |
| 2012/0110135 A1 | 5/2012 | Sparks et al. | |
| 2012/0135744 A1 | 5/2012 | Curtis et al. | |
| 2012/0143963 A1 | 6/2012 | Kennberg et al. | |
| 2012/0233256 A1 | 9/2012 | Shaham et al. | |
| 2014/0304260 A1* | 10/2014 | Ulm | 707/728 |

OTHER PUBLICATIONS

Taylor, Dave, document entitled "How to Find Your Friends on Face Book With the Facebook Friend Finder," Believed to be available prior to Dec. 4, 2008, Available at http://www.askdavetaylor.com/how_to_find_friends_facebook_facebook_friend_finder.html.

Allmond, Kenya, document entitled "Facebook Friend Finder: What You May Not Know About Your Data," Jun. 22, 2009, Available at http://gdgtgrl.net/2009/06/22/facebook-friend-finder-what-you-may-not-know-about-your-data/.

Notice of Allowance received for U.S. Appl. No. 14/076,583, Jun. 16, 2016.

Notice of Allowance received for U.S. Appl. No. 13/968,980, Jul. 2, 2015.

Patent Examination Report No. 1 received in Australian Patent Application No. 2011253646, Jul. 22, 2015.

Notice of Allowance received for U.S. Appl. No. 14/076,583, Jun. 19, 2015.

International Search Report and Written Opinion in International Application No. PCT/US2011/063794, dated Feb. 7, 2012, 10 pages, Feb. 7, 2012, 10 pages.

Notice of Allowance received for U.S. Appl. No. 13/968,980, Feb. 8, 2016.

Wikipedia, "Foursquare (service)/"[Retrieved on Dec. 7, 2010] Retrieved from the Internet: http://en.wikipedia/org/wiki/four-square_%28service%29?, pp. 1.

IPRP/Written Opinion and ISR for PCT/US2011420641 mailed May 2, 2011, 8 pages.

'Reading gets personal with popular items and personalized ranking' [online]. The Official Google Blog, Oct. 22, 2009, [retrieved on Jan. 27, 2010]. Retrieved from the Internet: http://googleblog.blogspot.com/2009/10/treading-gets-personal-with-popular-items-and-personalized-ranking.

Twitter [online], Wikipedia, [Retrieved on Jan. 27, 2010, Retrieved from the Internet: http://en.wikipedia.org/wiki/twitter.

'Gmail' [online], Wikipedia, Mar. 20, 2010, [retrieved on Mar. 22, 2010]. Retrieved from the Internet: http://en/wikipedia.org/w/index.php?title-gmail&oldid-350982667.

Facebook rolls out revamped news feed [online], The Christian Science Monitor, Oct. 23, 2009, [retrieved on Jan. 27, 2010]. Retrieved from the Internet: http://www.csmonitor.com/layout/set/print/content/view/print/261662.

(56) References Cited

OTHER PUBLICATIONS

International Search Report issued in PCT/US2011/023590 on Sep. 27, 2011.

Uncertified machine translation of KR 10-2009-0091854 (21 pages).

IPRP and Written Opinion from corresponding International Patent Application No. PCT/US2011/023590, mailed Aug. 23, 2012 (7 pgs.).

E. A. Vander Veer, Facebook: The Missing Manual, first edition, Published by O'Reilly Media, Inc. 2008.

IAB recommendations, examples of standard web advert sizes; Published Nov. 2009, http://en.wikipedia.org/wiki/File:Standard_web_banner_ad_sizes.svg, from internet on Feb. 6, 2013.

Hammitt, Jennifer, document entitled "How to Post Links on Facebook," updated: May 5, 2010 available at http:??www.ehow.com/how_4576098_post-links-facebook.html.

Hollows, Phil, document entitled "Automatic Facebook posts done right," Aug. 16, 2010, available at http://kb.feedblitz.com/article/AA-00576/0/Automatic-Facebook-posts-done-right.html/.

Google Groups, "foursquare API." [Retrieved on Dec. 7, 2010] Retrieved from the Internet: http://groups.google.com/group/foursquare-api/web/api-documentation?pli=1>, pp. 1-12.

Purdy, Kevin, "FourWhere Maps Out Foursquare Tips for Everybody," Lifehacker; Mar. 9, 2010, [Retrieved on Dec. 7, 2010] Retrieved from the Internet: http://lifehacker.com/5489053/fourwhere-maps-out-foursquare-tips-for-everybody8/15/13, pp. 1-2.

Thornton, James, "Find shops, restaurants, bars and amenities round you." Softonic: Let's Download!; Jan. 25, 2010 [Retrieved on Jan. 27, 2010] Retrieved from the Internet:http://aroundme.ensoftonic.com/iphone>, pp. 1-4;.

Notice of Allowance dated May 2, 2013 for related U.S. Appl. No. 12/962,002.

Non-Final Rejection dated Mar. 2, 2012 for related U.S. Appl. No. 12/756,681.

Final Rejection dated Sep. 27, 2012 for related U.S. Appl. No. 12/756,681.

Notice of Allowance dated Apr. 29, 2014 for related U.S. Appl. No. 12/756,681.

Non-Final Rejection dated Feb. 11, 2013 for related U.S. Appl. No. 12/702,155.

Notice of Allowance dated Jul. 12, 2013 for related U.S. Appl. No. 12/702,155.

Notice of Allowance dated Oct. 15, 2012 for related U.S. Appl. No. 12/702,022.

Non-Final Rejection dated Apr. 26, 2012 for related U.S. Appl. No. 12/702,022.

Non-Final Rejection dated Sep. 17, 2012 for related U.S. Appl. No. 12/962,002.

Non-Final Rejection dated Mar. 6, 2015 for related U.S. Appl. No. 14/076,583.

\* cited by examiner

US 9,729,352 B1

ASSISTING PARTICIPATION IN A SOCIAL NETWORK

BACKGROUND

This specification relates to assisting participation in a social network.

A social network is a social structure that represents individuals (or groups of individuals) as nodes and the relationships between those individuals as links between the nodes. A social network can be implemented as a member network that is available on the Internet, such as FACEBOOK, LINKEDIN, MYSPACE, and TWITTER. Member networks generally allow members to create a "profile" of information to represent themselves in the social network. Member networks also allow members to interact socially with other members, e.g., by exchanging messages and publishing content that is associated with their profile.

In a symmetric social network, related members necessarily share the same relationship with one another. Examples of such symmetric social networks include FACEBOOK, LINKEDIN, and MYSPACE, where two or more members establish bi-directionally equivalent "friend" or other relationships generally using an invitation/response protocol that effectively requires the consent of both members to the relationship. Such bi-directionally equivalent relationships provide the same social interaction possibilities to the related members.

In an asymmetric social network, a first member's relationship to a second member is not necessarily the same as the second member's relationship to the first member. Since the character of the social interaction between members in a member network can be defined in accordance with the nature of the relationship between those members, a first member in an asymmetric social network may interact with a second member in ways that differ from the social interaction provided for the second member to interact with the first member. An example of such an asymmetric social network is TWITTER, where a first member may be a follower of a second member without the second member necessarily being a follower of the first. Indeed, in many asymmetric social networks, a second member need not even know a first member's identity even though the first member has a relationship to the second member.

SUMMARY

This specification relates to assisting the authoring of posts to an asymmetric social network. A post is a user submission that is re-transmitted to the group of people who are associated with the author.

In a first aspect, a method is performed by a system of one or more data processing devices. The method includes receiving, at the system, a historical record of message exchange between an individual and members in a member network, the system determining, for each of the members, whether the individual is likely to want to be related to the respective member, each determination considering the number and transactional characteristics of the message exchange between the individual and the respective member in the historical record, and the system outputting the determinations that the individual is likely to want to be related to at least two of the respective members.

Implementations of this first aspect and the second and third aspects can include one or more of the following features. The method can also include receiving, at the system from the individual, a request to register as a new member in the member network. The determinations of whether the individual is likely to want to be related to the members and the outputting of the determinations can be done in response to the receipt of the request to register the individual and as part of a registration process. Determining whether the individual is likely to want to be related to the members can include considering the timing of the messages exchanged between the individual and each of the respective members, whether the messages sent by each of the respective members to the individual were read by the individual, the reading of the messages sent to both the individual and to each of the respective members, and the number and transactional characteristics of both electronic mail messages and chat messages. Determining whether the individual is likely to want to be related to the members can include comparing a probability that each of the respective members is a member to whom the individual is likely to want to be related with a threshold. The method can also include outputting identifiers of the members to whom the individual is likely to want to be related to a display screen for confirmation by the individual.

In a second aspect, a computer storage medium is encoded with a computer program. The program includes instructions that when executed by one or more data processing devices cause the one or more data processing devices to perform operations. The operations include receiving, from an individual, a request to register as a new member in an asymmetric social network, responding to the request by displaying a user interface to the individual, the user interface including information characterizing two or more members in the asymmetric social network to whom the individual is likely to want to be related as a follower, confirming establishment of the follower relationships with the two or more members with the individual, and adding the individual to the asymmetric social network. The addition includes establishing the individual as a follower of the two or more members.

Implementations of this second aspect and the first and third aspects can include one or more of the following features. Confirming the follower relationships can include implicitly confirming the follower relationships by the individual's failure to request that the follower relationships be changed. The user interface can include a preview of a profile of the individual in the asymmetric social network and an interactive widget programmed to change the profile in response to user interaction. The user interface can include an identifier of the individual and an image associated with the individual in the preview. The user interface can include information characterizing members in the asymmetric social network who follow the individual. The user interface can include an interactive widget programmed to end the following of at least one of the two or more members in the asymmetric social network in response to user interaction. The individual can be added to the asymmetric social network in response to user interaction with a widget that confirms the establishment of the follower relationships. Adding the individual to the asymmetric social network can also include responding to the user interaction with the widget that confirms the establishment of the follower relationships by displaying a second user interface. The second user interface can include a text box programmed to receive user input authoring a post to the asymmetric social network.

In a third aspect, a system can include a first database that stores a collection of member information that characterizes members in an asymmetric social network, a second database that stores a collection of historical records of transactional characteristics of exchanges of messages, wherein at least some of the members in the asymmetric social network are recipients or senders of the exchanged messages, and an asymmetric social network server comprising one or more data processing devices programmed to implement the asymmetric social network. The asymmetric social network server is programmed to access the historical records of the transactional characteristics in the first database and identify members in the asymmetric social network with whom new relationships are likely to be established based on the historical records of the transactional characteristics.

Implementations of this third aspect and the first and second aspects can include one or more of the following features. The asymmetric social network server can include a registration request receiver. The registration request receiver can trigger the identification of members in the asymmetric social network with whom new relationships are likely to be established in response to a request to register in the asymmetric social network. The system of claim 16, can include machine-readable instructions for generating a user interface. The user interface can include information characterizing two or more members in the asymmetric social network to whom an individual is likely to want to be related as a follower. The two or more members can be identified based on a number and the transactional characteristics of the messages exchanged between the individual and the two or more members in the collection of historical records. The two or more members can be identified based on the timing of the messages sent from the individual to each of the two or more members. The system can include a client data processing device displaying a user interface for interacting with a message system. The user interface can include an interactive element programmed to trigger, in response to user interaction, a request to the asymmetric social network to register as a new member in the asymmetric social network.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
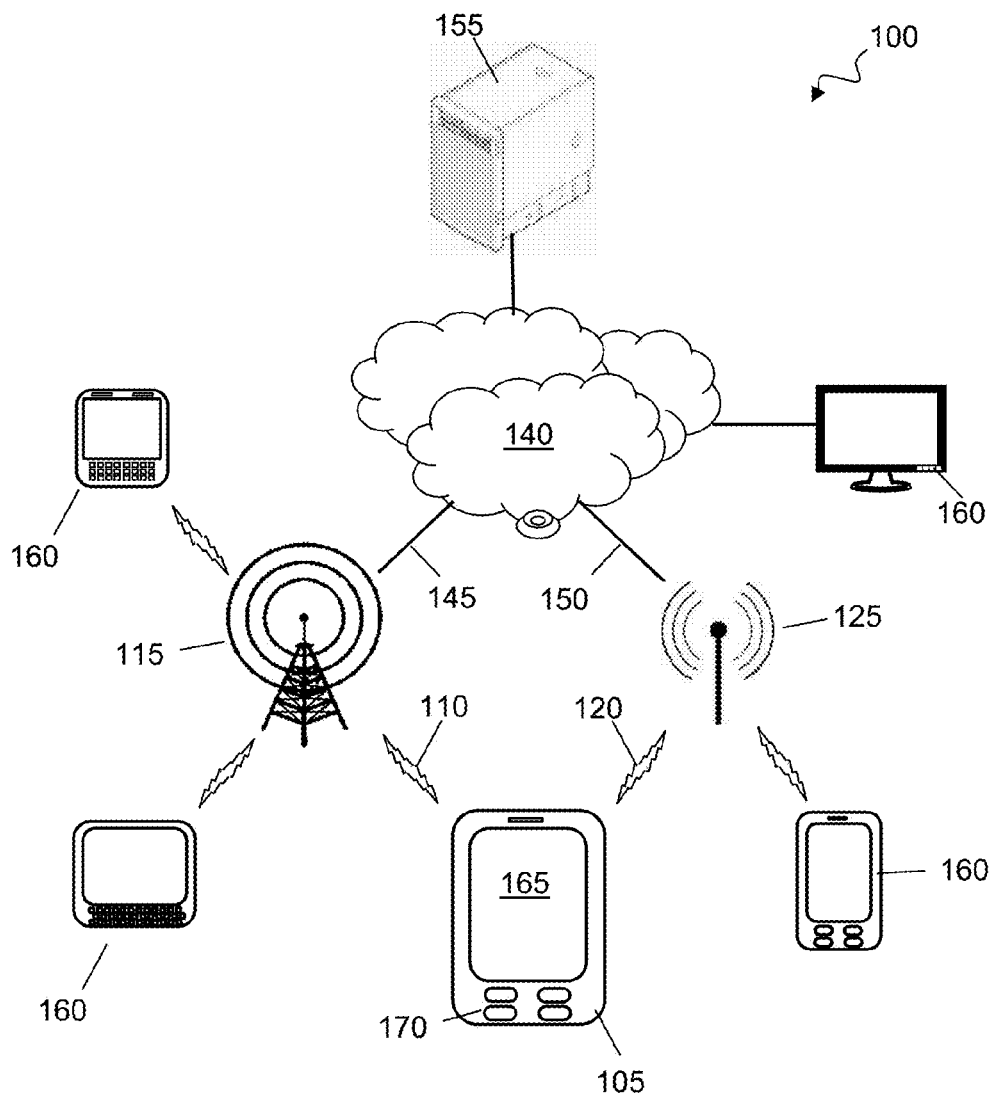
FIG. 1 is a schematic representation of a system of electronic devices that exchange information and provide social interaction.

FIG. 1 is a schematic representation of a system 100 of electronic devices that exchange information and provide social interaction. System 100 includes a handheld, mobile device 105 that is associated with a first user. Mobile device 105 is a digital data processing device that includes one or more wireless or wired data communication components. The user of mobile device 105 can use the data communication components to interact socially with other individuals using a social network, as described further below.

In the illustrated implementation of system 100, mobile device 105 includes two wireless data communication components, namely, a mobile phone transceiver and a WiFi transceiver. The mobile phone transceiver is able to exchange messages 110 with a phone base station 115. The WiFi transceiver is able to exchange messages 120 with a WiFi access point 125.

Phone base station 115 and WiFi access point 125 are connected for data communication with one or more data communication networks 140 via data links 145, 150 and can exchange information with a server 155. Mobile device 105 and server 155 can thus exchange information relevant to the social interaction over a social network. For example, server 155 can receive information characterizing the contents of a post that the first user wishes to transmit via a social network. Server 155 will generally also be able to transmit such a post to the first user's followers on the social network, as described further below.

One or more additional digital data processing devices 160, which are associated with one or more other users, are also connected for data communication with data communication networks 140 and can exchange information with a social network server 155. Data processing devices 160 can be connected to data communication networks 140 by wired or wireless data links, as the case may be. Data processing devices 160 and social network server 155 can thus also exchange information relevant to the social interaction over the social network, as described further below. Data processing devices 160 can be, e.g., mobile, handheld data processing devices or larger data processing devices, such desktop or laptop computers.

Social network server 155 is a collection of one or more digital data processing devices that perform data processing activities in accordance with the logic of machine-readable instructions. Among the data processing activities performed by social network server 155 are activities that implement a social network. In some implementations, the social network is an asymmetric social network. In addition to social network activities, social network server 155 can in some implementations perform data processing activities that implement other functionality. For example, social network server 155 can perform data processing activities that implement one or more of a search engine that searches a collection of electronic documents available on the Internet, an electronic mail or chat message server, a photosharing network, and other platforms that support interaction between users. As a consequence of such additional data processing activities, social network server 155 can have access to data that would not otherwise be available to a stand-alone social network server. For example, social network server 155 may have access to, e.g., an index of the content of electronic documents available on the Internet, screenshots of some portion of those documents, electronic mail or chat data, identification tags on photos on a photo-sharing network, and the like, as described further below.

In addition to one or more wireless or wired data communication components, mobile device 105 can also include a display screen 165 and one or more input devices 170. In some implementations, display screen 165 can act as both an input and an output. For example, display screen 165 can be a touch screen that both displays graphical elements on a screen and detects the presence and location of interaction with the screen. Input devices 170 can include one or more, e.g., key, pad, trackball, or other component that receives mechanical, audio, or other input from a user. In some implementations, mobile device 105 can include additional components such as a GPS unit, accelerometers, a digital camera, audio jacks, and the like.

Figure 2:
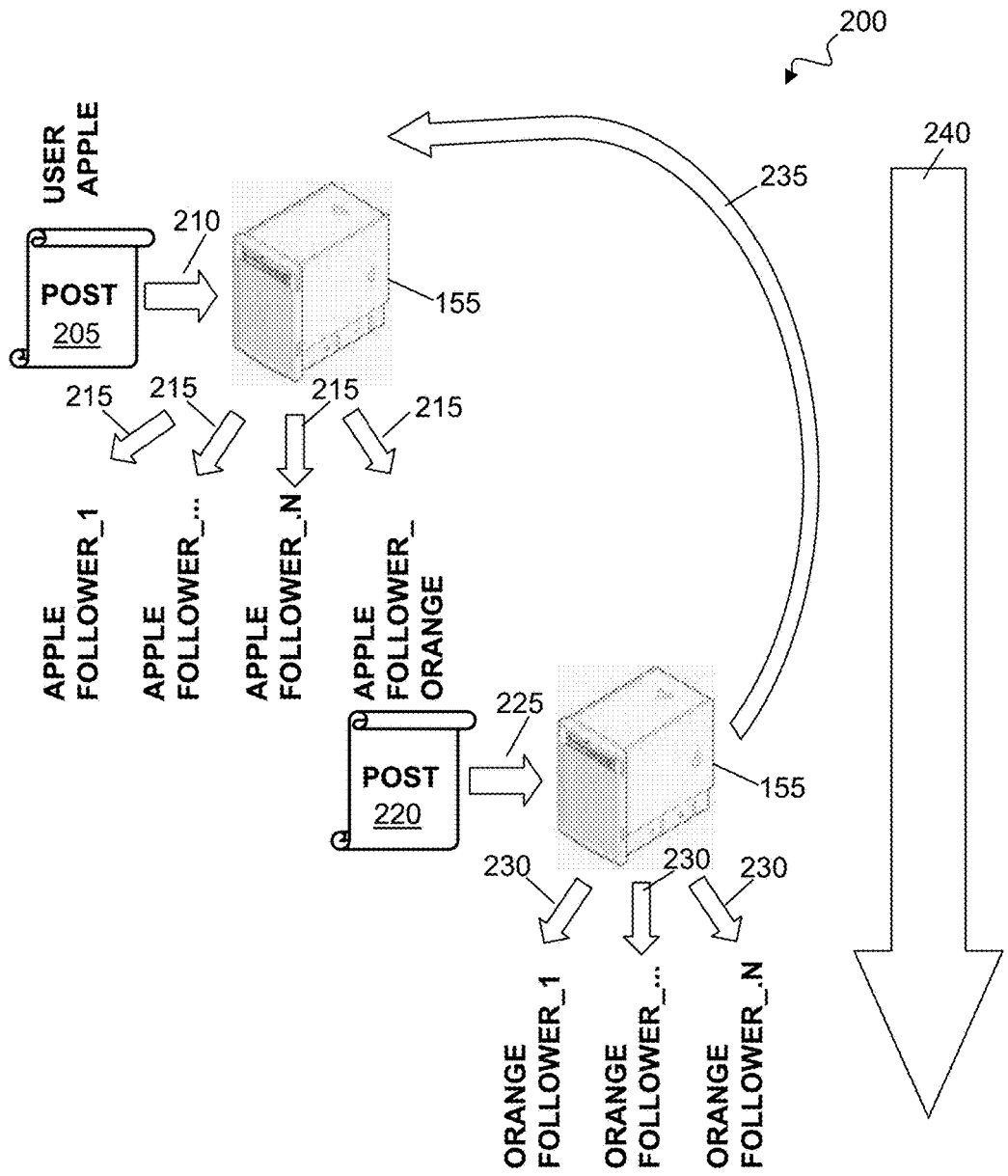
FIG. 2 is a schematic representation of an implementation of a collection of activities in an asymmetric social network.

FIG. 2 is a schematic representation of an implementation of a collection of activities 200 in an asymmetric social network. Activities 200 occur in the context of a single level asymmetric social network in which a first member can become a follower of a second member without the second member necessarily becoming a follower of the first member. In the illustrated implementation, a first user "Apple" authors a post 205 using a data processing device (e.g., mobile device 105 or data processing devices 160 (FIG. 1)). The data processing device can also receive input from the first user that triggers "posting" of post 205. Post 205 is accordingly transmitted at 210 to social network server 155, which receives the transmission, identifies the transmission as a posting by the first user, and identifies members who are related to the first member as followers in the network. Social network server 155 then relays content from post 205 to those followers at 215. These followers can receive and review the transmitted content at one or more data processing devices (e.g., devices 160 (FIG. 1)).

One of the followers, namely, second user "Orange," may chose to reply to the content from post 205 and author a reply post 220 using a data processing device (e.g., one of devices 160 (FIG. 1)). This data processing device can also receive input from the second user that triggers posting of reply post 220. Reply post 220 is accordingly transmitted at 225 to asymmetric social network server 155, which receives the transmission, identifies the transmission as a reply posting by the second user, and identifies members who are related to the second member as followers in the network. Social network server 155 also identifies the author of the post that is being replied to, namely, first user "Apple." Social network server 155 then relays content from reply post 220 to both the followers of second user "Orange" at 230 and to the author of post 205 at 235. The followers of second user "Orange" can receive and review the transmitted content from reply post 220 at one or more data processing devices (e.g., devices 160 (FIG. 1)). The author of post 205 (i.e., first user "Apple") can receive and review the transmitted content from reply post 220 at one or more data processing devices (e.g., mobile device 105 (FIG. 1)).

As a consequence of the asymmetry in the relationships between members, there is a directionality to the flow of posts in the illustrated asymmetric social network. In particular, posts tends to preferentially flow in the direction indicated by arrow 240, i.e., from an author to that author's followers. In the illustrated example, there is an exception to this directionality, namely, the transmission of content from reply post 220 to the author of post 205 at 235. Nevertheless, the preferred directionality is in the direction indicated by arrow 240.

Figure 3:
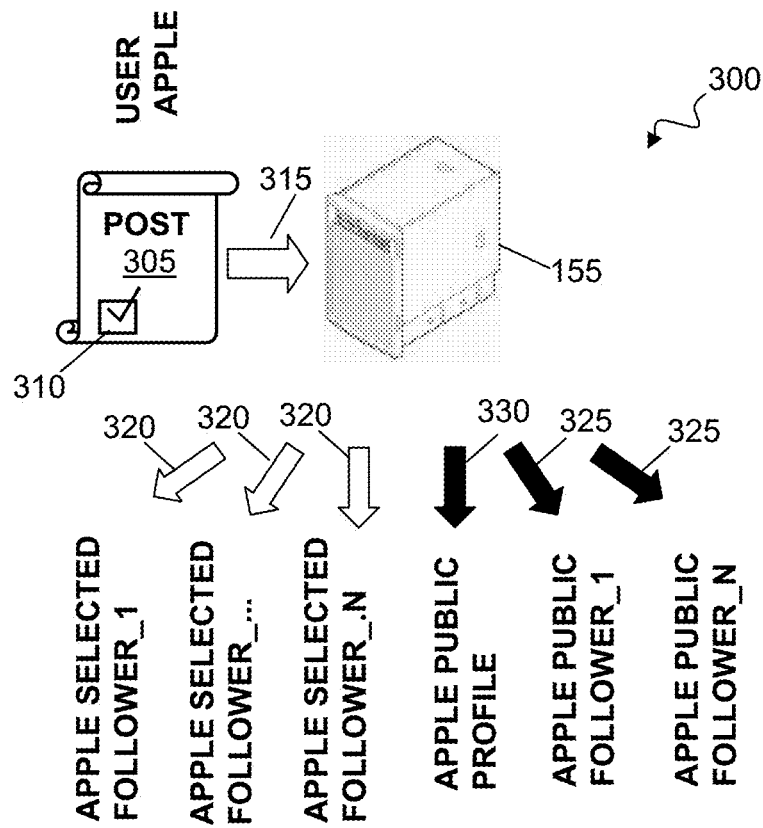
FIG. 3 is a schematic representation of an implementation of a collection of activities in an asymmetric social network

FIG. 3 is a schematic representation of an implementation of a collection of activities 300 in an asymmetric social network. Activities 300 occur in the context of a multiple level asymmetric social network in which a first member can become either a "public follower" or a "selected follower" of a second member without the second member necessarily becoming a follower of the first member. A public follower is a member of the asymmetric social network who receives a proper subset of the posts (i.e., the public posts) authored by the followed member. A selected follower is a member of the asymmetric social network who generally receives all of the posts (i.e., both public and private posts) authored by the followed member. In some implementations, a selected follower relationship between two members is established by an invitation/response protocol that effectively requires the consent of both members to the selected follower relationship.

In the illustrated implementation, first user "Apple" authors a post 305 using a data processing device (e.g., mobile device 105 or data processing devices 160 (FIG. 1)). In the course of authoring post 305, first user "Apple" indicates whether post 305 is a public or a private post, e.g., by interacting with an interactive element such as a widget that designates the post as a public or private post. Post 305 includes information characterizing the indication.

In response to input from the first user that triggers the posting of post 305, post 305 is accordingly transmitted at 315 to social network server 155, which receives the transmission, identifies the transmission as a posting by the first user, and determines whether post 305 is to be posted publicly or privately. In response to determining that post 305 is to be posted publicly, server 155 identifies both public and selected followers of first user "Apple" and relays content from post 305 to those followers at 320 and at 325. Server 155 also relays content from a post 305 that is to be posted publicly to the public profile of first user "Apple" at 330. A profile is a representation of an individual or a group of individuals on a member network. A profile generally includes details such as a name, a hometown, interests, pictures, and other information characterizing an individual or a group of individuals. A profile is public if other network members (or even the general public) do not require the consent of the represented individual or group in order to access the profile.

In response to determining that post 305 is to be posted privately, server 155 identifies selected followers of first user "Apple" and relays content from post 305 to those followers at 320. Private posts 305 are not relayed to public followers of first user "Apple" or to the public profile of first user "Apple." In either case, the followers to whom post 305 is relayed can receive and review the transmitted content at one or more data processing devices (e.g., devices 160 (FIG. 1)).

Activities 300 can also be used in posting a reply post (not shown). In particular, the author of a reply post can indicate whether a reply post is to be publicly or privately posted. In some implementations, a reply to a private post may be forbidden or delete information identifying the author of the replied-to post.

Figure 4:
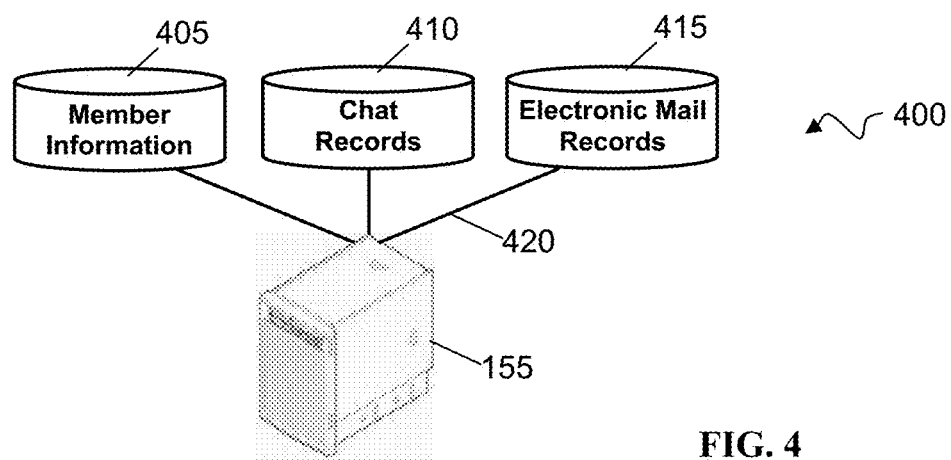
FIG. 4 is a schematic representation of an implementation of a social network server system.

FIG. 4 is a schematic representation of an implementation of a social network server system 400. Social network system 400 includes social network server 155 and databases 405, 410, 415. Each database 405, 410, 415 is a collection of information that is organized to be retrievable by server 155. Databases 405, 410, 415 are stored on one or more data storage devices and can be organized in accordance with any of a number of different data models. Databases 405, 410, 415 are accessible over one or more data links by social network server 155 in the course of implementing social network. In some implementations, the implemented social network can be an asymmetric social network.

Database 405 is a collection of member information that characterizes members in the asymmetric social network. The member information stored in database 405 can include member profiles and characterizations of the relationships between members. For example, the member information in database 405 can characterize which members follow which other members, the nature of any such following (e.g., public or selected), and how and when certain members came to follow other members.

Database 410 is a collection of historical records of the exchange of chat messages between individuals. At least some of the individuals are members in the asymmetric member network. The information in database 410 can include information characterizing the senders and intended recipients of chat messages, information characterizing how often chat messages are sent (i.e., the frequency of chat interactions), information characterizing how often chat messages are read, and information characterizing how often chat messages are replied to or forwarded. Database 410 will generally not include the content of the chat messages themselves. The chat messages can be private in that access to the chat communication is—absent a breach of security—restricted to the sender and one or more recipients.

Database 415 is a collection of historical records of the exchange of electronic mail messages between individuals. At least some of the individuals are members in the asymmetric member network. The information in database 410 can include information characterizing the senders and intended recipients of electronic mail messages, information characterizing how often electronic mail messages are sent (i.e., the frequency of electronic mail interactions), information characterizing how often electronic mail messages are read, and information characterizing how often electronic mail messages are replied to or forwarded. Database 415 will generally not include the content of the electronic mail messages themselves. The electronic mail messages can be private in that access to the electronic mail is—absent a breach of security—restricted to the sender and one or more recipients.

Figure 5:
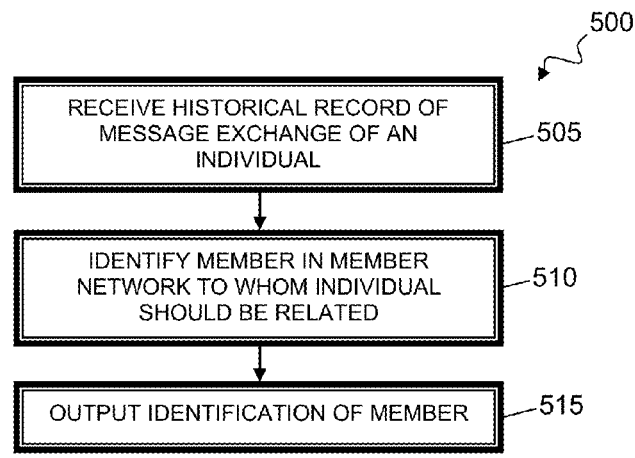
FIG. 5 is a flowchart of a process for assisting participation in a social network.
Figure 13:
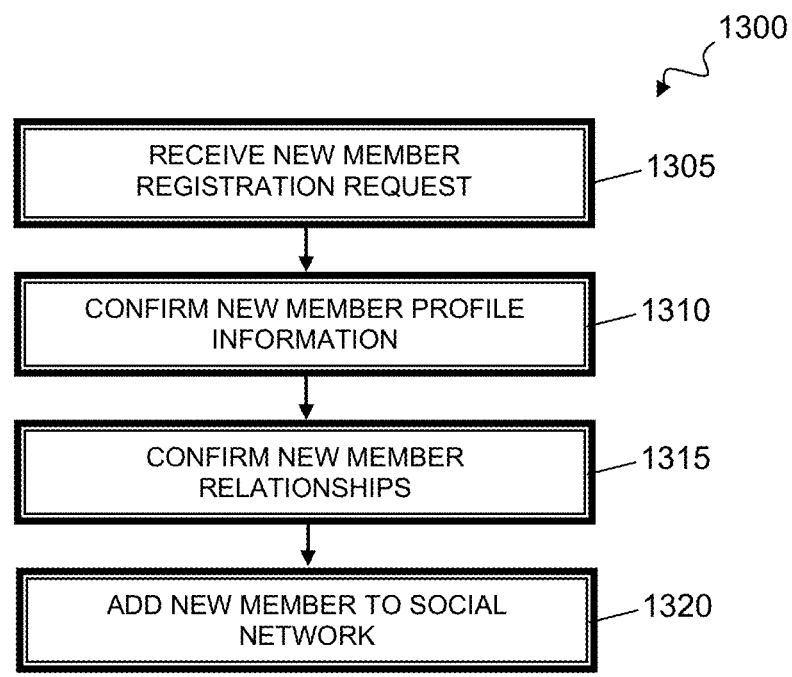
FIG. 13 is a flowchart of a process for assisting participation in a social network.
Figure 19:
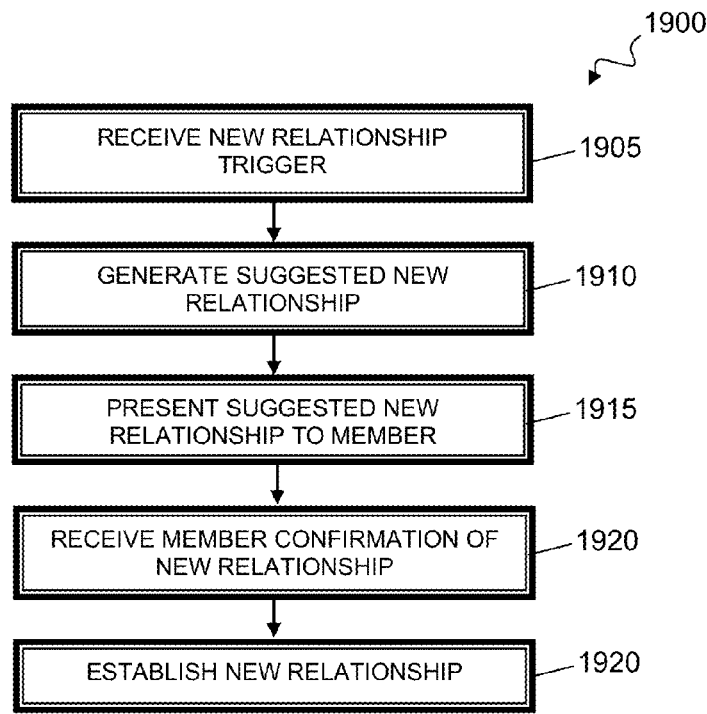
FIG. 19 is a flowchart of a process for assisting participation in a social network Like reference numbers and designations in the various drawings indicate like elements.

FIG. 5 is a flowchart of a process 500 for assisting participation in a social network. Process 500 can be performed by a device that includes one or more data processing devices that perform operations by executing one or more sets of machine-readable instructions to implement a social network. For example, process 500 can be performed by server 155 in the context of one or both of systems 100, 400 (FIGS. 1, 4). Process 500 can be performed in isolation or in conjunction with other digital data processing operations. For example, in some implementations, process 500 can be performed in conjunction with one or both of processes 1300, 1900 (FIGS. 13, 19).

The device performing process 500 receives a historical record of the exchange of messages by an individual at block 505. The messages can be incoming messages, outgoing messages, or both. The messages can be chat messages, electronic mail messages, or both.

The individual can be a person who is in the midst of joining a social network or a person who is already a member of a social network. The historical record can identify the recipients of the individual's outgoing messages. In some implementations, the historical record can also include information characterizing the transactional characteristics of the messages as well, such as when the messages were sent or received and whether the individual, when receiving incoming messages from others, opened, replied to, and/or forwarded the incoming messages. The received historical record will generally not include the content of the messages themselves, i.e., the text of the body of the messages. When process 500 is performed in the context of system 400, the messages can be chat message records received from database 410, electronic mail message record received from database 415, or both.

The historical record can be received by the device performing process 500 with the consent of the individual. The individual's consent can be explicit or implicit. For example, the device performing process 500 can be part of a server system that implements an electronic mail server, a chat message server, or both, as well as a social network. An individual's participation in the social network can be embedded within the electronic mail or chat message functionality provided by the device. For example, access to the social network can be provided to an individual after the individual has logged into an electronic mail or chat message server. The individual can thus access electronic mail or chat messages at the same time that the individual participates in the social network. This allows the individual to implicitly understand that those messages are available to the social network and consent to that availability.

The device performing process 500 identifies a member in the member network to whom the individual is likely to want to be related at block 510. The member is identified from amongst the senders and the recipients of the messages characterized in the historical record. The identification can be based on a calculation of the probability that the individual is likely to want to be related to a particular member. The calculation can consider, e.g., the number of messages that the individual has exchanged with the member and the transactional characteristics of those exchanges. As described further below, the transactional characteristics of the messages can include the time when the messages were sent or received, how often the messages were read, and whether the messages were replied to or forwarded. The calculation can embody the correlation between the number and transactional characteristics of other users' message exchanges and the members that those other member have selected to be related to in the member network, as described further below. The calculation will generally not identify every sender or recipient of an individual's messages who is also a member in the member network as a member to whom the individual is likely to want to be related. Rather, the calculation will generally classify some sender or recipient members as members to whom the individual is likely to want to be related and exclude other sender or recipient members from this classification.

The device performing process 500 outputs an identification of the member to whom the individual is likely to want to be related at block 515. The identification can include information characterizing the member's participation in the social network, such as the location of the member's profile, information drawn from the profile (such as a photo or avatar), or both. The identification can be output to a display screen for review by the individual, to a component of a social network server, or to both. For example, the identification of the member can be used by a component of a social network server to automatically suggest or subscribe the individual to a relationship with the member. For example, the relationship can be as a follower in an asymmetric social network, as described further below.

Figure 6:
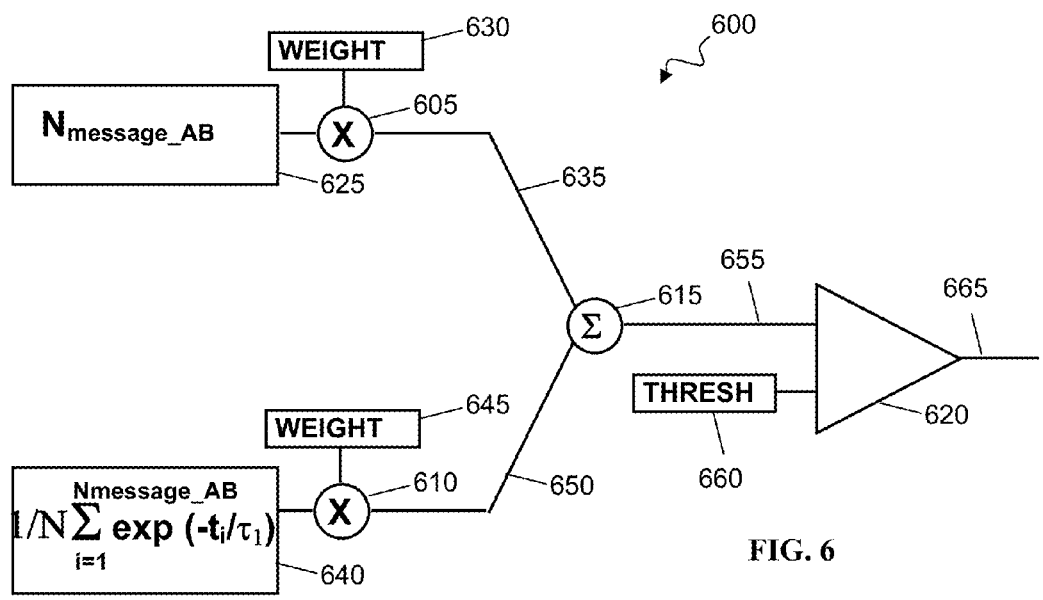
FIGS. 6-12 are schematic representations of devices for identifying members in a member network to whom the individual is likely to want to be related.

FIG. 6 is a schematic representation of a device 600 for identifying a member in the member network to whom the individual is likely to want to be related. Device 600 can be implemented in hardware, by a data processing device that performs operations in accordance with a set of machine-readable instructions, or in a combination thereof. Device 600 can be used in isolation or in conjunction with other devices. For example, device 600 can be a component of server 155 in the context of one or both of systems 100, 400 (FIGS. 1, 4). Device 600 can perform operations in isolation or as part of a larger set of activities. For example, device 600 can participate in the identification of a member in a member network to whom an individual is likely to want to be related at block 510 of process 500 (FIG. 5).

Device 600 includes a pair of multipliers 605, 610, a summer 615, and a comparator 620. Multiplier 605 is a hardware or software component that is configured to multiply the number of messages 625 exchanged between an individual "A" and a member "B" in the member network (i.e., "Nmessage_AB") by a weight 630. Weight 630 embodies correspondence between the number of messages that have been exchanged between an individual and a member and the probability that the individual would chose to be related to the member in the member network. In some implementations, weight 630 can be derived from statistical analysis of the behavior of other members in the member network. For example, weight 630 can be a correlation coefficient that embodies the correlation between the number of messages exchanged between other members on the member network and the existence of relationships between those members. Multipliers 605 outputs a value 635 characterizing the probability that the individual would chose to be related to the member in the member network that is attributable to the number of messages 625 exchanged between the individual and the member.

Multiplier 610 is a hardware or software component that is configured to multiply a parameter 640 that characterizes the timing of the messages exchanged between an individual "A" and a member "B" and a weight 645. Parameter 640 changes as the time since messages were sent to embody the principle that an individual "A" who exchanged messages with a member "B" more recently would be more likely to choose to be related to member "B" that an individual "A" who exchanged messages with a member "B" less recently.

In the illustrated implementation, this principle is embodied in a parameter 640 that is based on the sum of a collection of values, each of which is associated with an individual message and each of which decays over time. In particular, for each of "i" individual messages exchanged by the individual and a member (i.e., each "message_AB"), an exponentially decaying value $(\exp(-t_i/\ _1))$ is calculated, wherein $t_i$ is the time since the message "i" was sent and "$_1$" is a rate constant that embodies the rate of decrease in probability that the individual would chose to be related to that member in the member network. The exponentially decaying values of all "N" messages exchanged by the individual and the member are then summed. In some implementations, parameter 640 is also normalized by the number of messages "N" (as shown) and parameter 1040 is an average of the decayed time since the messages were sent.

Weight 645 embodies correspondence between parameter 640 and the probability that the individual would chose to be related to the member in the member network. In some implementations, weight 645 can be derived from statistical analysis of the behavior of other members in the member network. For example, weight 645 can be a correlation coefficient that embodies the correlation between such normalized sums and the existence of relationships between those other members. Multiplier 610 outputs a value 650 characterizing the probability that the individual would chose to be related to the member in the member network that is attributable to the timing of the messages exchanged between the individual and the member.

Summer 615 receives values 635, 650 and sums them to generate a composite value 655 that characterizes the probability that the individual would chose to be related to the member in the member network. Composite value 655 embodies both the number of messages 625 exchanged between an individual "A" and a member "B" and the timing of those messages. Comparator 620 receives composite value 655 and compares it with a threshold value 660. Threshold value 660 is a threshold for composite value 655 beyond which the member "B" will be identified as a member to whom the individual "A" is likely to want to be related in the member network. Threshold value 660, and the other threshold values described herein, can be stored as digital data in a data storage device or embodied, e.g., as an analog voltage or current. Comparator 620 outputs a result 665 of the comparison. When device 600 operates in the context of process 500, an identification of member "B" can be output at step 515 (FIG. 5) in response to result 665 indicating that composite value 655 is beyond threshold value 660. The identification of member "B" can be used, e.g., to suggest or subscribe individual "A" as a follower of member "B" in an asymmetric social network.

Figure 7:
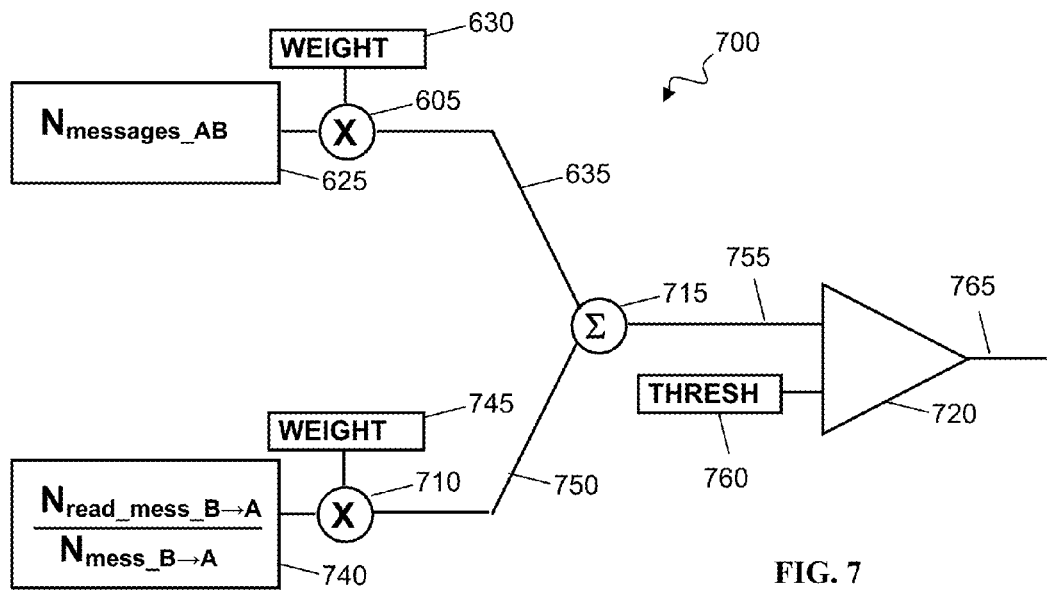

FIG. 7 is a schematic representation of a device 700 for identifying a member in the member network to whom the individual is likely to want to be related. Device 700 can be implemented in hardware, by a data processing device that performs operations in accordance with a set of machine-readable instructions, or in a combination thereof. Device 700 can be used in isolation or in conjunction with other devices. For example, device 700 can be a component of server 155 in the context of one or both of systems 100, 400 (FIGS. 1, 4). Device 700 can perform operations in isolation or as part of a larger set of activities. For example, device 700 can participate in the identification of a member in a member network to whom an individual is likely to want to be related at block 510 of process 500 (FIG. 5)

Device 700 includes a pair of multipliers 605, 710, a summer 715, and a comparator 720. Multiplier 710 is a hardware or software component that is configured to multiply a parameter 740 that characterizes the reading—by individual "A"—of messages sent by member "B" and a weight 745. In the illustrated implementation, parameter 740 is the percent of messages sent by member "B" to individual "A" that were read. This percent is given by the number "N" of messages from member "B" to individual "A" that were read (i.e., messages "read_mess_B→A") divided by the number "N" of messages sent from member "B" to individual "A" (i.e., messages "mess_B→A").

Weight 745 embodies correspondence between parameter 740 and the probability that the individual would chose to be related to the member in the member network. In some implementations, weight 745 can be derived from statistical analysis of the behavior of other members in the member network. For example, weight 745 can be a correlation coefficient that embodies the correlation between the reading of messages and the existence of relationships between members. Multiplier 710 outputs a value 750 characterizing the probability that the individual would chose to be related to the member in the member network that is attributable to the individual's reading of messages that are sent by the member.

Summer 715 receives values 635, 750 and sums them to generate a composite value 755 that characterizes the probability that the individual would chose to be related to the member in the member network. Composite value 755 embodies both the number of messages 625 exchanged between an individual "A" and a member "B" and the reading—by individual "A"—of messages sent by member "B." Comparator 720 receives composite value 755 and compares it with a threshold value 760. Threshold value 760 is a threshold for composite value 755 beyond which the member "B" will be identified as a member to whom the individual "A" is likely to want to be related in the member network. Comparator 720 outputs a result 765 of the comparison. When device 700 operates in the context of process 500, an identification of member "B" can be output at step 515 (FIG. 5) in response to result 765 indicating that composite value 755 is beyond threshold value 760. The identification of member "B" can be used, e.g., to suggest or subscribe individual "A" as a follower of member "B" in an asymmetric social network.

Figure 8:
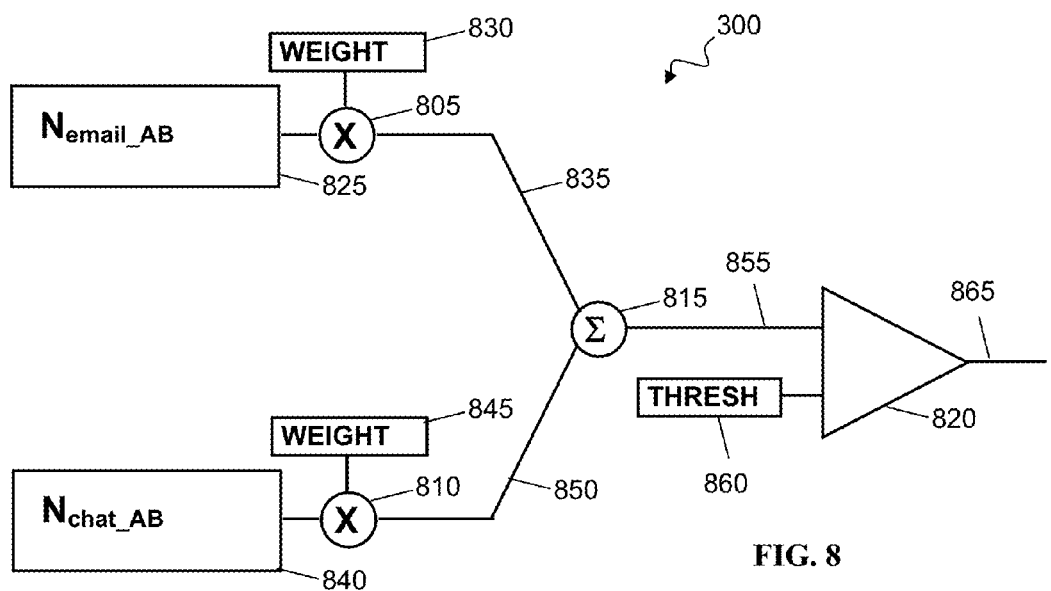

FIG. 8 is a schematic representation of a device 800 for identifying a member in the member network to whom the individual is likely to want to be related. Device 800 can be implemented in hardware, by a data processing device that performs operations in accordance with a set of machine-readable instructions, or in a combination thereof. Device 800 can be used in isolation or in conjunction with other devices. For example, device 800 can be a component of server 155 in the context of one or both of systems 100, 400 (FIGS. 1, 4). Device 800 can perform operations in isolation or as part of a larger set of activities. For example, device 800 can participate in the identification of a member in a member network to whom an individual is likely to want to be related at block 510 of process 500 (FIG. 5)

Device 800 includes a pair of multipliers 805, 810, a summer 815, and a comparator 820. Multiplier 805 is a hardware or software component that is configured to multiply the number "N" of electronic mail messages 825 exchanged between an individual "A" and a member "B" in the member network (i.e., "Nemail_AB") by a weight 830. Weight 830 embodies correspondence between the number of electronic mail messages that have been exchanged between an individual and a member and the probability that the individual would chose to be related to the member in the member network. In some implementations, weight 830 can be derived from statistical analysis of the behavior of other members in the member network. For example, weight 830 can be a correlation coefficient that embodies the correlation between the number of electronic mail messages exchanged between other members on the member network and the existence of relationships between those members. Multipliers 805 outputs a value 835 characterizing the probability that the individual would chose to be related to the member in the member network that is attributable to the number of electronic messages 825 exchanged between the individual and the member.

Multiplier 810 is a hardware or software component that is configured to multiply the number of chat messages 840 exchanged between an individual "A" and a member "B" in the member network (i.e., "Nchat_AB") by a weight 845. Weight 845 embodies correspondence between the number of chat messages that have been exchanged between an individual and a member and the probability that the individual would chose to be related to the member in the member network. In some implementations, weight 845 can be derived from statistical analysis of the behavior of other members in the member network. For example, weight 845 can be a correlation coefficient that embodies the correlation between the number of chat messages exchanged between other members on the member network and the existence of relationships between those members. Multipliers 810 outputs a value 850 characterizing the probability that the individual would chose to be related to the member in the member network that is attributable to the number of chat messages 840 exchanged between the individual and the member.

Summer 815 receives values 835, 850 and sums them to generate a composite value 855 that characterizes the probability that the individual would chose to be related to the member in the member network. Composite value 855 embodies both the number of electronic mail messages 825 and the number of chat messages 840 exchanged between an individual "A" and a member "B." Comparator 820 receives composite value 855 and compares it with a threshold value 860. Threshold value 860 is a threshold for composite value 855 beyond which the member "B" will be identified as a member to whom the individual "A" is likely to want to be related in the member network. Comparator 820 outputs a result 865 of the comparison. When device 800 operates in the context of process 500, an identification of member "B" can be output at step 515 (FIG. 5) in response to result 865 indicating that composite value 855 is beyond threshold value 860. The identification of member "B" can be used, e.g., to suggest or subscribe individual "A" as a follower of member "B" in an asymmetric social network.

Figure 9:
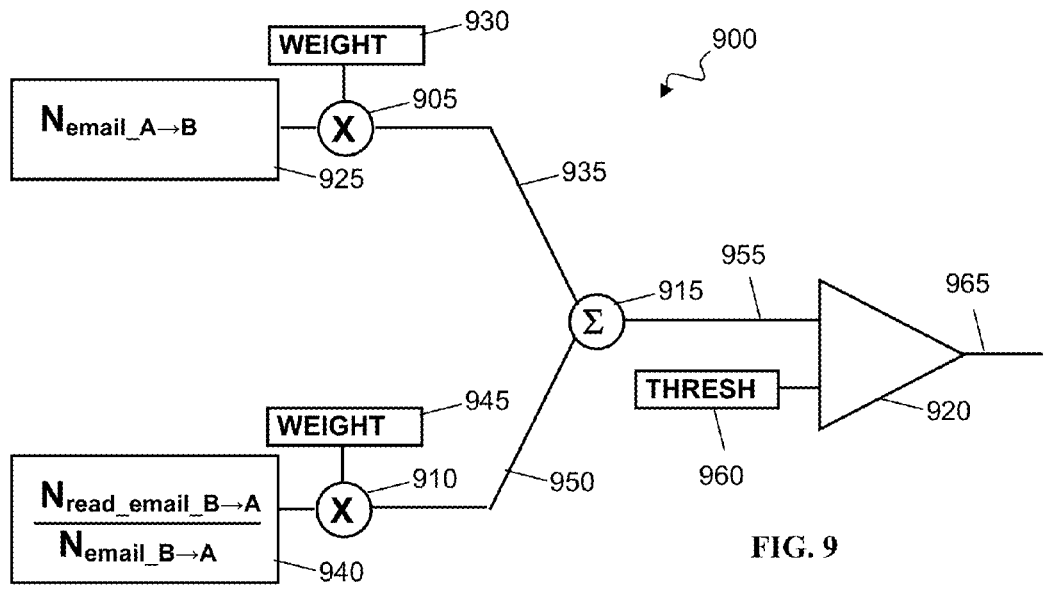

FIG. 9 is a schematic representation of a device 900 for identifying a member in the member network to whom the individual is likely to want to be related. Device 900 can be implemented in hardware, by a data processing device that performs operations in accordance with a set of machine-readable instructions, or in a combination thereof. Device 900 can be used in isolation or in conjunction with other devices. For example, device 900 can be a component of server 155 in the context of one or both of systems 100, 400 (FIGS. 1, 4). Device 900 can perform operations in isolation or as part of a larger set of activities. For example, device 900 can participate in the identification of a member in a member network to whom an individual is likely to want to be related at block 510 of process 500 (FIG. 5)

Device 900 includes a pair of multipliers 905, 710, a summer 915, and a comparator 920. Multiplier 905 is a hardware or software component that is configured to multiply the number "N" of electronic mail messages 825 sent by an individual "A" to a member "B" in the member network (i.e., "Nemail_A→B") by a weight 830. Weight 930 embodies correspondence between the number of electronic mail messages that have been sent by an individual "A" to a member "B" and the probability that the individual would chose to be related to the member in the member network. In some implementations, weight 930 can be derived from statistical analysis of the behavior of other members in the member network. For example, weight 930 can be a correlation coefficient that embodies the correlation between the number of electronic mail messages sent by from one member to another on the member network and the existence of relationships between those members. Multipliers 905 outputs a value 935 characterizing the probability that the individual would chose to be related to the member in the member network that is attributable to the number of electronic messages 925 sent by the individual to the member.

Multiplier 910 is a hardware or software component that is configured to multiply a parameter 940 that characterizes the reading—by individual "A"—of electronic mail messages sent by member "B" and a weight 945. In the illustrated implementation, parameter 940 is the percent of electronic mail messages sent by member "B" to individual "A" that were read. This percent is given by the number "N" of electronic mail messages from member "B" to individual "A" that were read (i.e., electronic mail messages "read_e-mail_B→A") divided by the number "N" of electronic mail messages sent by member "B" to individual "A" (i.e., electronic mail messages "email_B→A").

Weight 945 embodies correspondence between parameter 940 and the probability that the individual would chose to be related to the member in the member network. In some implementations, weight 945 can be derived from statistical analysis of the behavior of other members in the member network. For example, weight 945 can be a correlation coefficient that embodies the correlation between the reading of electronic mail messages and the existence of relationships between members. Multiplier 910 outputs a value 950 characterizing the probability that the individual would chose to be related to the member in the member network that is attributable to the individual's reading of electronic mail messages that are sent by the member.

Summer 915 receives values 935, 950 and sums them to generate a composite value 955 that characterizes the probability that the individual would chose to be related to the member in the member network. Composite value 955 embodies both the number of electronic mail messages 925 sent by individual "A" to member "B" and the reading—by individual "A"—of electronic mail messages sent by member "B." Comparator 920 receives composite value 955 and compares it with a threshold value 960. Threshold value 960 is a threshold for composite value 955 beyond which the member "B" will be identified as a member to whom the individual "A" is likely to want to be related in the member network. Comparator 920 outputs a result 965 of the comparison. When device 900 operates in the context of process 500, an identification of member "B" can be output at step 515 (FIG. 5) in response to result 965 indicating that composite value 955 is beyond threshold value 960. The identification of member "B" can be used, e.g., to suggest or subscribe individual "A" as a follower of member "B" in an asymmetric social network.

Figure 10:
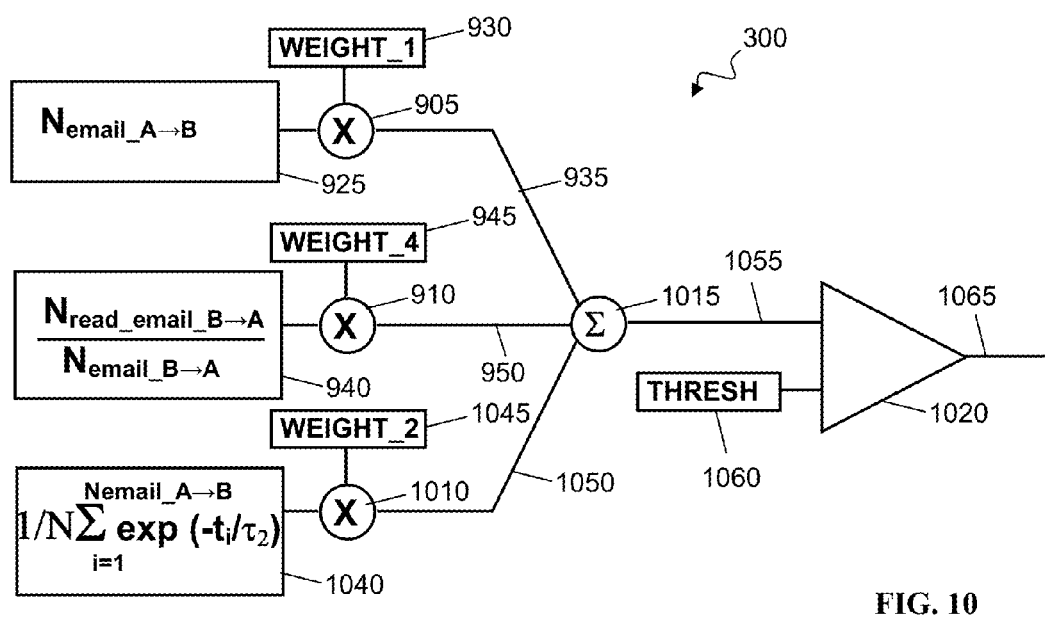

FIG. 10 is a schematic representation of a device 1000 for identifying a member in the member network to whom the individual is likely to want to be related. Device 1000 can be implemented in hardware, by a data processing device that performs operations in accordance with a set of machine-readable instructions, or in a combination thereof. Device 1000 can be used in isolation or in conjunction with other devices. For example, device 1000 can be a component of server 155 in the context of one or both of systems 100, 400 (FIGS. 1, 4). Device 1000 can perform operations in isolation or as part of a larger set of activities. For example, device 1000 can participate in the identification of a member in a member network to whom an individual is likely to want to be related at block 510 of process 500 (FIG. 5)

Device 1000 includes multipliers 905, 910, 1010, a summer 1015, and a comparator 1020. Multiplier 1010 is a hardware or software component that is configured to multiply a parameter 1040 that characterizes the timing of electronic mail messages sent by an individual "A" to a member "B" (i.e., "email_A→B") and a weight 1045. Parameter 1040 changes as the time since messages were sent to embody the principle that an individual "A" who sent messages to a member "B" more recently would be more likely to choose to be related to member "B" that an individual "A" who sent messages to a member "B" less recently.

In the illustrated implementation, this principle is embodied in a parameter 1040 that is based on the sum of a collection of values, each of which is associated with an individual electronic mail message sent from individual "A" to member "B" and each of which decays over time. In particular, for each of "i" individual electronic mail messages sent from individual "A" to member "B" (i.e., each "email_A→B"), an exponentially decaying value $(\exp(-t_i/\ ))$ is calculated, wherein $t_i$ is the time since the electronic mail message "i" was sent and " " is a rate constant that embodies the rate of decrease in probability that the individual would chose to be related to that member in the member network. The exponentially decaying values of all "N" electronic mail messages exchanged by the individual and the member are then summed. In some implementations, parameter 1040 is also normalized by the number of electronic mail messages "N" (as shown) and parameter 1040 is an average of the decayed time since the electronic mail messages were sent.

Weight 1045 embodies correspondence between parameter 1040 and the probability that the individual would chose to be related to the member in the member network. In some implementations, weight 1045 can be derived from statistical analysis of the behavior of other members in the member network. For example, weight 1045 can be a correlation coefficient that embodies the correlation between such normalized sums and the existence of relationships between those other members. Multiplier 1010 outputs a value 1050 characterizing the probability that the individual would chose to be related to the member in the member network that is attributable to the timing of the electronic mail messages sent by individual to the member.

Summer 1015 receives values 935, 950, 1050 and sums them to generate a composite value 1055 that characterizes the probability that the individual would chose to be related to the member in the member network. Composite value 1055 embodies the number of electronic mail messages 925 sent by individual "A" to member "B," the timing of those electronic mail messages, and the reading—by individual "A"—of electronic mail messages sent by member "B." Comparator 1020 receives composite value 1055 and compares it with a threshold value 1060. Threshold value 1060 is a threshold for composite value 1055 beyond which the member "B" will be identified as a member to whom the individual "A" is likely to want to be related in the member network. Comparator 1020 outputs a result 1065 of the comparison. When device 1000 operates in the context of process 500, an identification of member "B" can be output at step 515 (FIG. 5) in response to result 1065 indicating that composite value 1055 is beyond threshold value 1060. The identification of member "B" can be used, e.g., to suggest or subscribe individual "A" as a follower of member "B" in an asymmetric social network.

Figure 11:
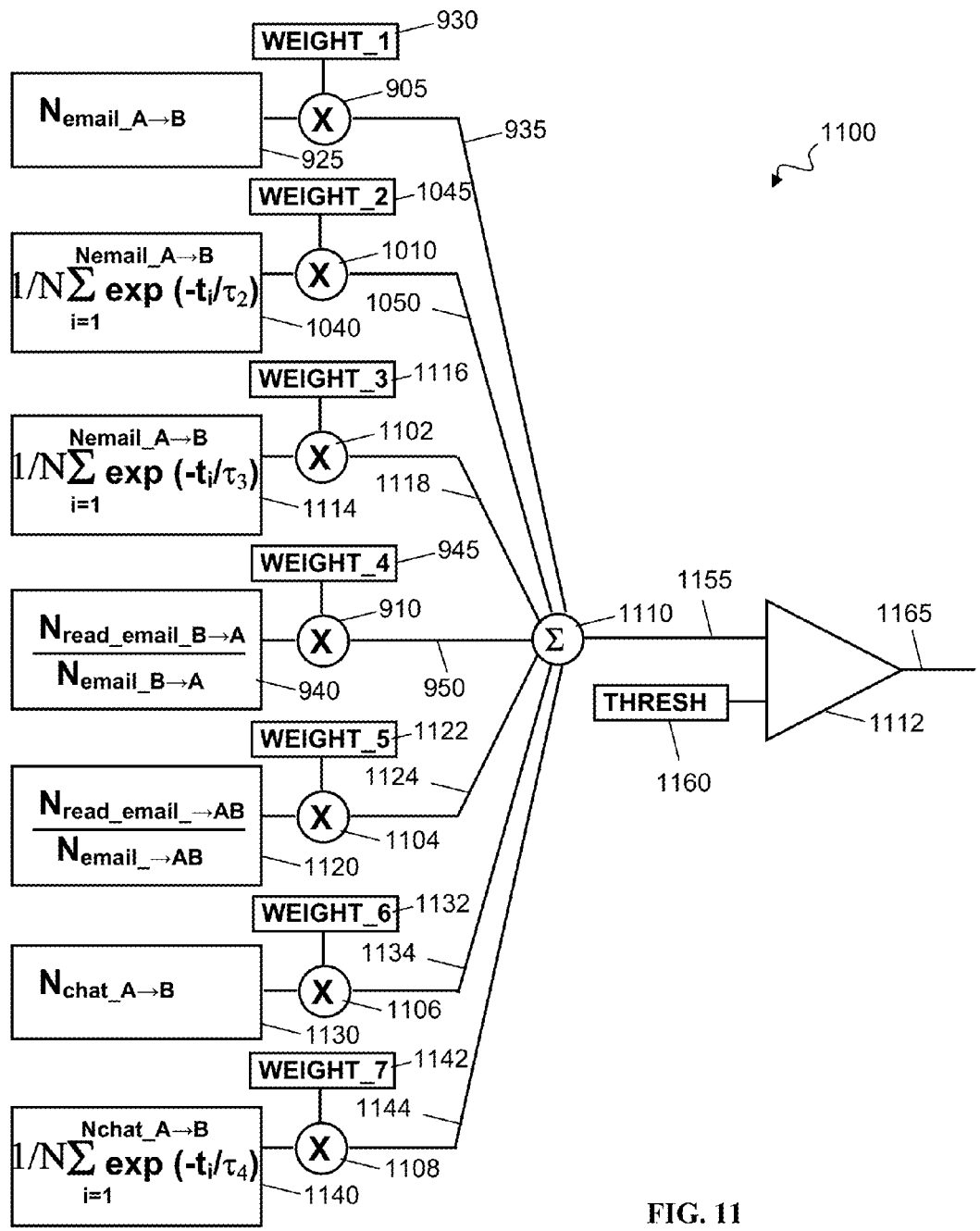

FIG. 11 is a schematic representation of a device 1100 for identifying a member in the member network to whom the individual is likely to want to be related. Device 1100 can be implemented in hardware, by a data processing device that performs operations in accordance with a set of machine-readable instructions, or in a combination thereof. Device 1100 can be used in isolation or in conjunction with other devices. For example, device 1100 can be a component of server 155 in the context of one or both of systems 100, 400 (FIGS. 1, 4). Device 1100 can perform operations in isolation or as part of a larger set of activities. For example, device 1100 can participate in the identification of a member in a member network to whom an individual is likely to want to be related at block 510 of process 500 (FIG. 5)

Device 1100 includes multipliers 905, 910, 1010, 1102, 1104, 1106, 1108, a summer 1110, and a comparator 1112. Multiplier 1102 is a hardware or software component that is configured to multiply a parameter 1114 that characterizes the timing of electronic mail messages sent by an individual "A" to a member "B" (i.e., "email_A→B") and a weight 1116. Parameter 1114 changes as the time since electronic mail messages were sent to embody the principle that an individual "A" who sent electronic mail messages to a member "B" more recently would be more likely to choose to be related to member "B" that an individual "A" who sent electronic mail messages to a member "B" less recently.

In the illustrated implementation, this principle is embodied in a parameter 1114 that is based on the sum of a collection of values, each of which is associated with an individual electronic mail message sent from individual "A" to member "B" and each of which decays over time. In particular, for each of "i" individual electronic mail messages sent from individual "A" to member "B" (i.e., each "email_A→B"), an exponentially decaying value $(\exp(-t_i/\tau_3))$ is calculated, wherein $t_i$ is the time since the electronic mail message "i" was sent and "$\tau_3$" is a rate constant that embodies the rate of decrease in probability that the individual would chose to be related to that member in the member network. In some implementations, rate constant $\tau_3$ differs from rate constant $\tau_2$. The difference between rate constants $\tau_2$ and $\tau_3$ allows the passage of time since electronic mail messages sent from individual "A" to member "B" to impact the identification of member "B" as a member to whom the individual "A" would choose to be related in different ways.

The exponentially decaying values of all "N" electronic mail messages exchanged by the individual and the member are then summed. In some implementations, parameter 1114 is also normalized by the number of electronic mail messages "N" (as shown) and parameter 1114 is an average of the decayed time since the electronic mail messages were sent.

Weight 1116 embodies correspondence between parameter 1114 and the probability that the individual would chose to be related to the member in the member network. In some implementations, weight 1116 can be derived from statistical analysis of the behavior of other members in the member network. For example, weight 1116 can be a correlation coefficient that embodies the correlation between such normalized sums and the existence of relationships between those other members. Multiplier 1102 outputs a value 1118 characterizing the probability that the individual would chose to be related to the member in the member network that is attributable to the timing of the electronic mail messages sent by individual to the member.

Multiplier 1104 is a hardware or software component that is configured to multiply a parameter 1120 that characterizes the reading—by individual "A"—of electronic mail messages sent to both individual "A" and member "B" and a weight 1122. In the illustrated implementation, parameter 1120 is the percent of electronic mail messages sent to both individual "A" and member "B" that were read by individual "A." This percent is given by the number "N" of electronic mail messages to individual "A" and member "B" that were read by individual "A" (i.e., electronic mail messages "read_email_→AB") divided by the number "N" of electronic mail messages sent to both individual "A" and member "B" (i.e., electronic mail messages "email_→AB").

Weight 1122 embodies correspondence between parameter 1120 and the probability that the individual would chose to be related to the member in the member network. In some implementations, weight 1122 can be derived from statistical analysis of the behavior of other members in the member network. For example, weight 1122 can be a correlation coefficient that embodies the correlation between the reading of electronic mail messages sent commonly to members and the existence of relationships between those members. Multiplier 1104 outputs a value 1124 characterizing the probability that the individual would chose to be related to the member in the member network that is attributable to the individual's reading of electronic mail messages that are sent both to that individual and to the member.

Multiplier 1106 is a hardware or software component that is configured to multiply the number of chat messages 1130 sent by an individual "A" to a member "B" in the member network (i.e., "Nchat_A→B") by a weight 1132. Weight 1132 embodies correspondence between the number of chat messages that have been sent by an individual to a member and the probability that the individual would chose to be related to that member in the member network. In some implementations, weight 1132 can be derived from statistical analysis of the behavior of other members in the member network. For example, weight 1132 can be a correlation coefficient that embodies the correlation between the number of chat messages sent from one member to another on the member network and the existence of relationships between those members. Multipliers 1106 outputs a value 1134 characterizing the probability that the individual would chose to be related to the member in the member network that is attributable to the number of chat messages 1130 sent by that individual to the member.

Multiplier 1108 is a hardware or software component that is configured to multiply a parameter 1140 that characterizes the timing of chat messages sent by an individual "A" to a member "B" (i.e., "chat_A→B") and a weight 1142. Parameter 1140 changes as the time since chat messages were sent to embody the principle that an individual "A" who sent chat messages to a member "B" more recently would be more likely to choose to be related to member "B" that an individual "A" who sent chat messages to a member "B" less recently.

In the illustrated implementation, this principle is embodied in a parameter 1140 that is based on the sum of a collection of values, each of which is associated with an individual chat message sent from individual "A" to member "B" and each of which decays over time. In particular, for each of "i" individual chat messages sent from individual "A" to member "B" (i.e., each "chat_A→B"), an exponentially decaying value $(\exp(-t_i/\tau_4))$ is calculated, wherein $t_i$ is the time since the chat message "i" was sent and "$\tau_4$" is a rate constant that embodies the rate of decrease in probability that the individual would chose to be related to that member in the member network. In some implementations, rate constant $\tau_4$ differs from rate constants $\tau_{2,3}$.

The exponentially decaying values of all "N" chat messages exchanged by the individual and the member are then summed. In some implementations, parameter 1140 is also normalized by the number of chat messages "N" (as shown) and parameter 1140 is an average of the decayed time since the chat messages were sent.

Weight 1140 embodies correspondence between parameter 1140 and the probability that the individual would chose to be related to the member in the member network. In some implementations, weight 1140 can be derived from statistical analysis of the behavior of other members in the member network. For example, weight 1140 can be a correlation coefficient that embodies the correlation between such normalized sums and the existence of relationships between those other members. Multiplier 1108 outputs a value 1144 characterizing the probability that the individual would chose to be related to the member in the member network that is attributable to the timing of the chat messages sent by individual to the member.

Summer 1015 receives values 935, 950, 1050, 1118, 1124, 1134, 1144 and sums them to generate a composite value 1155 that characterizes the probability that the individual would chose to be related to the member in the member network. Composite value 1155 embodies the number of electronic mail messages 925 sent by individual "A" to member "B," the timing of those electronic mail messages, the reading—by individual "A"—of electronic mail messages sent by member "B," the reading—by individual "A"—of electronic mail messages sent to both that individual "A" and to member "B," the number of chat messages 925 sent by individual "A" to member "B," and the timing of those chat messages. Comparator 1112 receives composite value 1155 and compares it with a threshold value 1160. Threshold value 1160 is a threshold for composite value 1155 beyond which the member "B" will be identified as a member to whom the individual "A" is likely to want to be related in the member network. Comparator 1112 outputs a result 1165 of the comparison. When device 1100 operates in the context of process 500, an identification of member "B" can be output at step 515 (FIG. 5) in response to result 1165 indicating that composite value 1155 is beyond threshold value 1160. The identification of member "B" can be used, e.g., to suggest or subscribe individual "A" as a follower of member "B" in an asymmetric social network.

Figure 12:
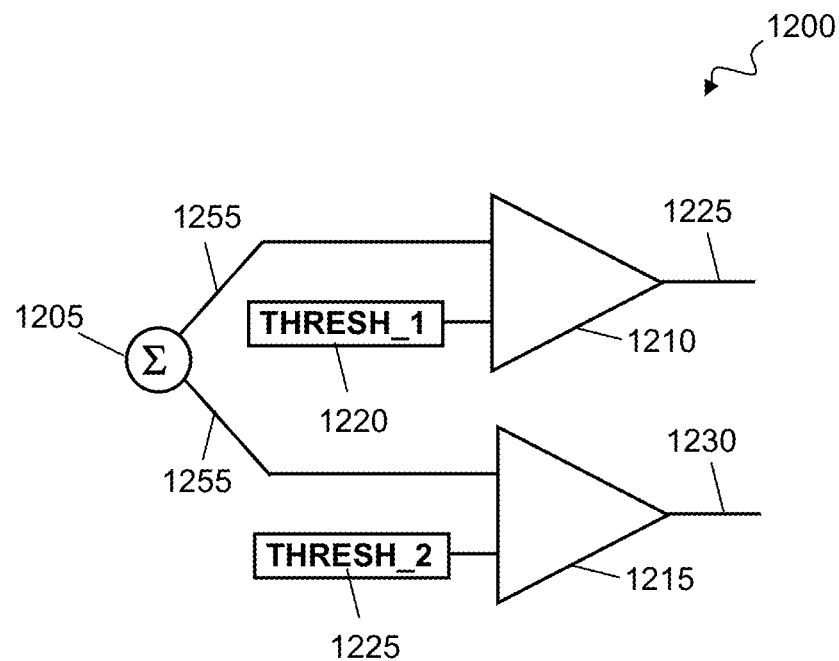

FIG. 12 is a schematic representation of a device 1200 for identifying a member in the member network to whom the individual is likely to want to be related. Device 1200 can be implemented in hardware, by a data processing device that performs operations in accordance with a set of machine-readable instructions, or in a combination thereof. Device 1200 can be used in isolation or in conjunction with other devices. For example, device 1200 can be used in place of summer 615, comparator 620, and threshold 660 in device 600 (FIG. 6), in place of summer 715, comparator 720, and threshold 760 in device 700 (FIG. 7), in place of summer 815, comparator 820, and threshold 860 in device 800 (FIG. 8), in place of summer 915, comparator 920, and threshold 960 in device 900 (FIG. 9), in place of summer 1015, comparator 1020, and threshold 1060 in device 1000 (FIG. 10), or in place of summer 1110, comparator 1112, and threshold 1160 in device 1100 (FIG. 11). Device 1200 can perform operations in isolation or as part of a larger set of activities. For example, device 1200 can participate in the identification of a member in a member network to whom an individual is likely to want to be related at block 510 of process 500 (FIG. 5).

Device 1200 includes a summer 1205, a pair of comparators 1210, 1215, and a pair of threshold values 1220, 1225.

In operation, summer 1205 receives two or more values and sums them to generate a composite value 1255 that characterizes the probability that the individual would chose to be related to the member in the member network. Composite value 1255 can embody the characteristics of the values received by summer 1205. Comparators 1210, 1215 both receive composite value 1255. Comparator 1210 compares composite value 1255 with threshold value 1220 and outputs a result 1225 of the comparison. Comparator 1210 compares composite value 1255 with threshold value 1225 and outputs a result 1230 of the comparison.

Threshold value 1220 is a threshold for composite value 1155 beyond which the member "B" will be identified as a member to whom the individual "A" is likely to want to be related at a first level in an asymmetric social network. For example, threshold value 1220 can be a threshold for composite value 1155 beyond which the member "B" will be identified as a member to whom the individual "A" should be publicly related in an asymmetric social network, e.g., as a public follower.

Threshold value 1225 is a threshold for composite value 1155 beyond which the member "B" will be identified as a member to whom the individual "A" is likely to want to be related at a second level in an asymmetric social network. For example, threshold value 1225 can be a threshold for composite value 1155 beyond which the member "B" will be identified as a member to whom the individual "A" should be selectively related in an asymmetric social network, e.g., as a selected follower.

When device 1200 operates in the context of process 500, the identification of member "B" can be output at step 515 (FIG. 5) in response to result 1225 indicating that composite value 1255 is beyond threshold value 1220 or in response to result 1230 indicating that composite value 1255 is beyond threshold value 1225. The identifications can be used, e.g., to suggest or subscribe individual "A" as a public or selected follower of member "B" in an asymmetric social network, as appropriate.

FIG. 13 is a flowchart of a process 1300 for assisting participation in a social network. Process 1300 can be performed by a device that includes one or more data processing devices that perform operations by executing one or more sets of machine-readable instructions to implement a social network. For example, process 1300 can be performed by server 155 in the context of one or both of systems 100, 400 (FIGS. 1, 4). Process 500 can be performed in isolation or in conjunction with other digital data processing operations. For example, in some implementations, process 1300 can be performed in conjunction with process 500 (FIG. 5). As another example, in some implementations, process 1300 can be performed in conjunction with process 1900 (FIG. 19).

The device performing process 1300 receives a request from an individual to register as a new member in a social network at block 1305. The social network can be an asymmetric social network. In some implementations, the request can be received from an individual who is interacting with an electronic mail or chat message server after the individual has logged in. For example, the request can be received as a consequence of user interaction with an interactive element that is displayed in a window along with electronic mail or chat messages of the individual.

The device performing process 1300 confirms a set of profile information for the new member with the individual at block 1310. The confirmed profile information can include the name of the representation of the individual on the social network, an image of the representation of the individual on the social network, the identity of members who are related to the individual on the social network, and the information that is to be publicly available. The confirmation of the profile information can be explicit or implicit. For example, the individual's failure to request that a default set of profile information be edited can be taken as a confirmation of the profile information.

The device performing process 1300 confirms one or more relationships between the individual and one or more other members in the social network with the individual at block 1315. In some implementations, the relationships can be relationships with members who are identified at block 515 in process 500 (FIG. 5). In some implementations, the relationships can be relationships in an asymmetric social network that establish the individual as a follower of other members in the asymmetric social network. The confirmation of the relationships can be explicit or implicit. For example, the individual's failure to request that a default set of relationships be edited can be taken as a confirmation of those relationships.

In some implementations, the device performing process 1300 confirms the profile information and the relationships at the same time, e.g., when the individual interacts with a single interactive display element that either explicitly or implicitly confirms the profile information and the relationships.

The device performing process 1300 adds the individual to the social network as a new member at block 1320. In general, the new member is provided with access to all of the functionality of the social network, including functionality for authoring and posting posts and functionality for accessing posts by others. Thus, in implementations where the confirmed relationships are relationships with members who are identified at block 515 in process 500, the new member need not take any action to affirmatively identify other members with who a relationship is to be established before participating in the social network. For example, the new member need not affirmatively identify the names of other members to a data processing device that implements the social network. The new member need not request relationships with those other members. The new member need not provide a data processing device that implements the social network access to a contact list. Instead, the individual can register and participate as a member of the social network simply by confirming a collection of relationships identified from a historical record of message exchange by the individual.

Figure 14:
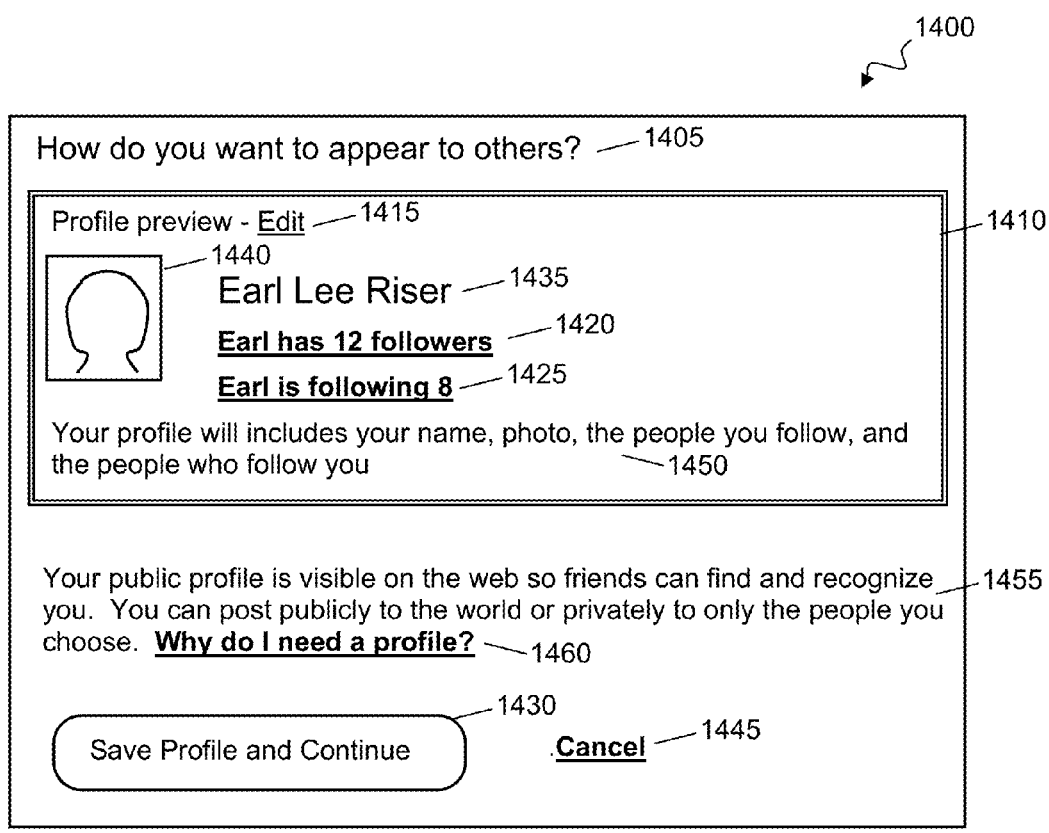
FIGS. 14-18 are schematic representations of user interfaces that assist individuals in participating in a social network.

FIG. 14 is a schematic representation of a user interface 1400 that assists an individual in participating in a social network. In the illustrated implementation, the social network is a single level asymmetric social network, i.e., with one class of followers. In other implementations, user interface 1400 can assist an individual in participating in a different social network, such as a multi level asymmetric social network and a symmetric social network where bi-directionally equivalent relationships (e.g., relationships between friends) exist. In such implementations, user interface 1400 characterizes and allows an individual to change the relationships supported by the network.

User interface 1400 is a graphical presentation that can be displayed to an individual who is in the process of registering to become a member of the social network. For example, user interface 1400 can be displayed to an individual in response to receipt of a request from the individual to register as a new member in the social network. When user interface 1400 is displayed in the context of process 1300, user interface 1400 can be used to confirm both the profile information at block 1310 and the relationships at 1315 for an individual and to trigger the addition of the individual to the social network as a new member at block 1320 (FIG. 13).

User interface 1400 includes a heading 1405, a profile preview 1410, a profile edit widget 1415, one or more relationship edit widgets 1420, 1425, and a confirmation widget 1430. Heading 1405 is text or other information that indicates to a viewer that the individual's representation on the member network (i.e., the individual's "profile") can be changed. Profile preview 1410 is a preview of that representation on the member network. In the illustrated implementation, profile preview 1410 includes the name or other identifier 1435 of the individual, an image 1440 associated with the individual, and a characterization of the members who are to be related to the individual in the member network. In the illustrated implementation, the characterization of the to-be-related members is provided by a pair of relationship edit widgets 1420, 1425. Widgets are textual or other interactive display elements that trigger determined data processing activities in response to user interaction.

Relationship edit widget 1420 includes text that characterizes members that are to be related to the individual as followers in the asymmetric social network (i.e., the individual has 12 followers). In response to user interaction, relationship edit widget 1420 triggers the display of additional information characterizing the to-be-followers and interactive elements for changing the to-be-followers, as described further below. Relationship edit widget 1425 includes text that characterizes members that the individual is to follow in the asymmetric social network (i.e., the individual is to follow 8 members). In response to user interaction, relationship edit widget 1425 triggers the display of additional information characterizing the members to be followed and interactive elements for changing the members to be followed, as described further below.

Confirmation widget 1430 is an interactive display element that, in response to user interaction, triggers the addition of the new member to the asymmetric social network. The addition of the new member to the asymmetric social network can include saving the individual's profile. The individual's profile can be saved to one or more data storage devices. In some implementations, user interaction with confirmation widget 1430 also triggers the display of a user interface that includes one or more text entry fields programmed to receive the text of a post to the social network. In these implementations, after submitting a request, the individual can begin authoring a post after reviewing the automatically generated profile and relationships. Although the individual has the option to edit his or her profile and relationships, it is not necessary for the individual to so. Instead, the individual can accept the automatically generated profile and relationships and begin authoring posts to the member network without further ado.

User interaction with confirmation widget 1430 can thus be interpreted as an implicit confirmation of the profile previewed in profile preview 1410 and the relationships characterized by relationship edit widgets 1420, 1425. In particular, an individual's failure to avail himself or herself of the opportunity to change either the profile or the characterized relationships implicitly confirms the profile and the relationships. User interface 1400 also includes a cancellation widget 1445. Cancellation widget 1445 is an interactive display element that, in response to user interaction, cancels the request for registration.

In the illustrated implementation, user interface 1400 also includes text 1450 that describes the content of the individual's profile in the member network, text 1455 that describes the role of profiles in the member network, and a widget 1460 that, in response to user interaction, triggers the display of additional information describing the role of profiles in the member network.

Figure 15:
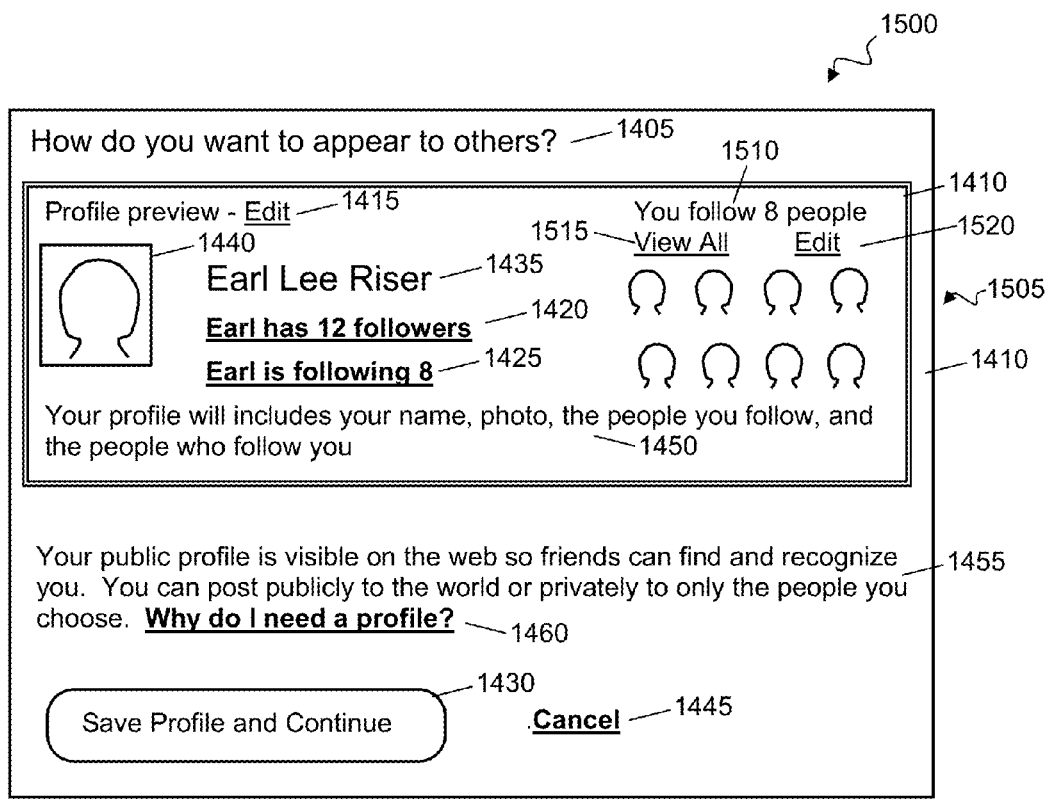

FIG. 15 is a schematic representation of a user interface 1500 that assists an individual in participating in a social network. In the illustrated implementation, the social network is a single level asymmetric social network, i.e., with one class of followers. In other implementations, user interface 1500 can assists individual in participating in a different social network, such as a multi level asymmetric social network and a symmetric social network where bi-directionally equivalent relationships (e.g., relationships between friends) exist. In such implementations, user interface 1500 characterizes and allows an individual to change the relationships supported by the network.

User interface 1500 is a graphical presentation that can be displayed to an individual who is in the process of registering to become a member of the social network. For example, user interface 1500 can be displayed to an individual in response to receipt of a request from the individual to register as a new member in the social network. In some implementations, user interface 1500 can be displayed in response to user interaction with another user interface during registration as a new member. For example, user interface 1500 can be displayed in response to user interaction with relationship edit widget 1425 in user interface 1400 (FIG. 14) When user interface 1500 is displayed in the context of process 1300, user interface 1500 can be used to confirm both the profile information at block 1310 and the relationships at 1315 for an individual and to trigger the addition of the individual to the social network as a new member at block 1320 (FIG. 13).

Profile preview 1410 in user interface 1500 includes additional information characterizing the members that the individual is to follow in the asymmetric social network. In particular, user interface 1500 includes a collection 1505 of images associated with those members that the individual is to follow and text or other indicium 1510 identifying that images in collection 1505 are indeed associated with those members who are to be followed.

In the illustrated implementation, user interface 1500 also includes a navigational widget 1515 and a follower edit widget 1520. Navigational widget 1515 is an interactive element that, in response to user interaction, allows an individual to navigate through additional information characterizing the members who are to be followed. In the illustrated implementation, navigational widget 1515 triggers the display of images that are associated with other members who are to be followed and that are presently absent from collection 1505. In some implementations, the navigational widget 1515 also triggers the display of the names or other identifier of the members who are to be followed. Follower edit widget 1520 is an interactive element that, in response to user interaction, triggers the display of interactive elements for changing the members to be followed, as described further below.

Figure 16:
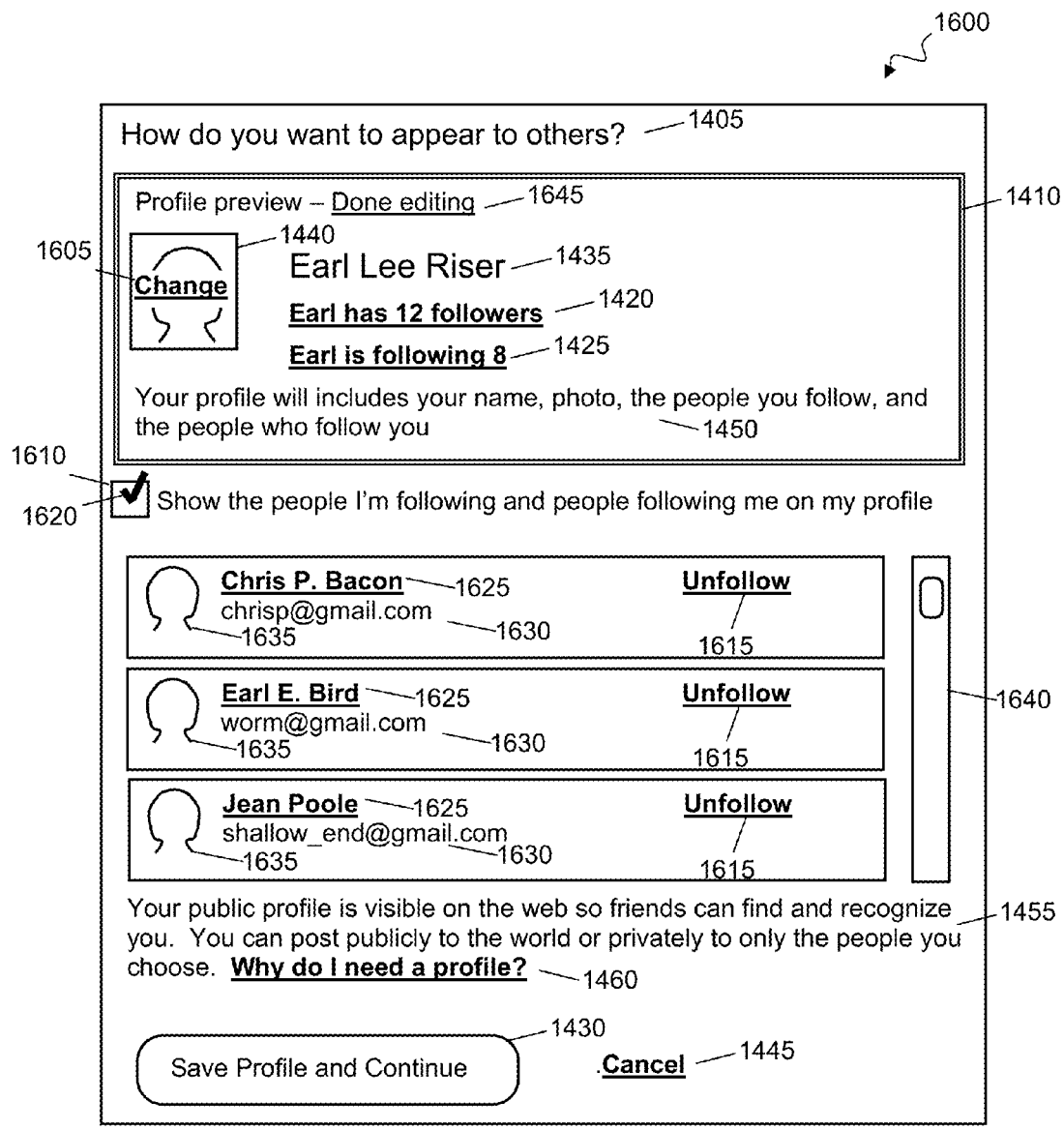

FIG. 16 is a schematic representation of a user interface 1600 that assists an individual in participating in a social network. In the illustrated implementation, the social network is a single level asymmetric social network, i.e., with one class of followers. In other implementations, user interface 1600 can assists individual in participating in a different social network, such as a multi level asymmetric social network and a symmetric social network where bi-directionally equivalent relationships (e.g., relationships between friends) exist. In such implementations, user interface 1600 characterizes and allows an individual to change the relationships supported by the network.

User interface 1600 is a graphical presentation that can be displayed to an individual who is in the process of registering to become a member of the social network. For example, user interface 1600 can be displayed to an individual in response to receipt of a request from the individual to register as a new member in the social network. In some implementations, user interface 1600 can be displayed in response to user interaction with another user interface during registration as a new member. For example, user interface 1600 can be displayed in response to user interaction with profile edit widget 1415 in user interfaces 1400, 1500 1700 (FIGS. 14, 15, 17) When user interface 1600 is displayed in the context of process 1300, user interface 1600 can be used to confirm both the profile information at block 1310 and the relationships at 1315 for an individual and to trigger the addition of the individual to the social network as a new member at block 1320 (FIG. 13).

User interface 1600 includes additional interactive elements for changing profile information and relationships for an individual in a social network. In particular, user interface 1500 includes one or more profile change widgets 1605, 1610 and one or more relationship change widgets 1615.

Profile change widget 1605 in an interactive display element that, in response to user interaction, allows an individual to change the image 1440 in the individual's profile that represents the individual in the social network. Profile change widget 1610 is an interactive element that, in response to user interaction, toggles between including and excluding information characterizing the member's relationships from the individual's profile. In the illustrated implementation, profile change widget 1610 includes an indicium 1620 that indicates whether the individual's profile is currently set to include or exclude such relationship-characterizing information.

Relationship change widgets 1615 are interactive elements that, in response to user interaction, change the relationships of the individual in the member network. In the illustrated implementation, each relationship change widget 1615 is associated with a collection of information characterizing the member whom the individual is to follow in the social network. Interaction with a relationship change widget 1615 ends the following relationship with the associated member. In the illustrated implementation, the collection of information characterizing each member includes that member's name or other identifier 1625, that member's electronic mail address 1630, and the image 1635 representing that member on the member network. User interface 1500 also includes a navigational widget 1640 that, in response to user interaction, navigates through the relationships of the individual in the member network. In the illustrated implementation, navigational widget 1640 allows a user to scroll through relationship change widgets 1615 and associated characterizing information for members whom the individual is to follow.

In the illustrated implementation, user interface 1500 also includes a save changes widget 1645. Done editing widget 1645 is an interactive element that, in response to user interaction, triggers saving of the changes made by the individual. The changes can be saved to one or more data storage devices. In some implementation, user interaction with done editing widget 1645 triggers the display of a different user interface, such as user interface 1400, 1500, 1700 (FIGS. 14, 15, 17).

Figure 17:
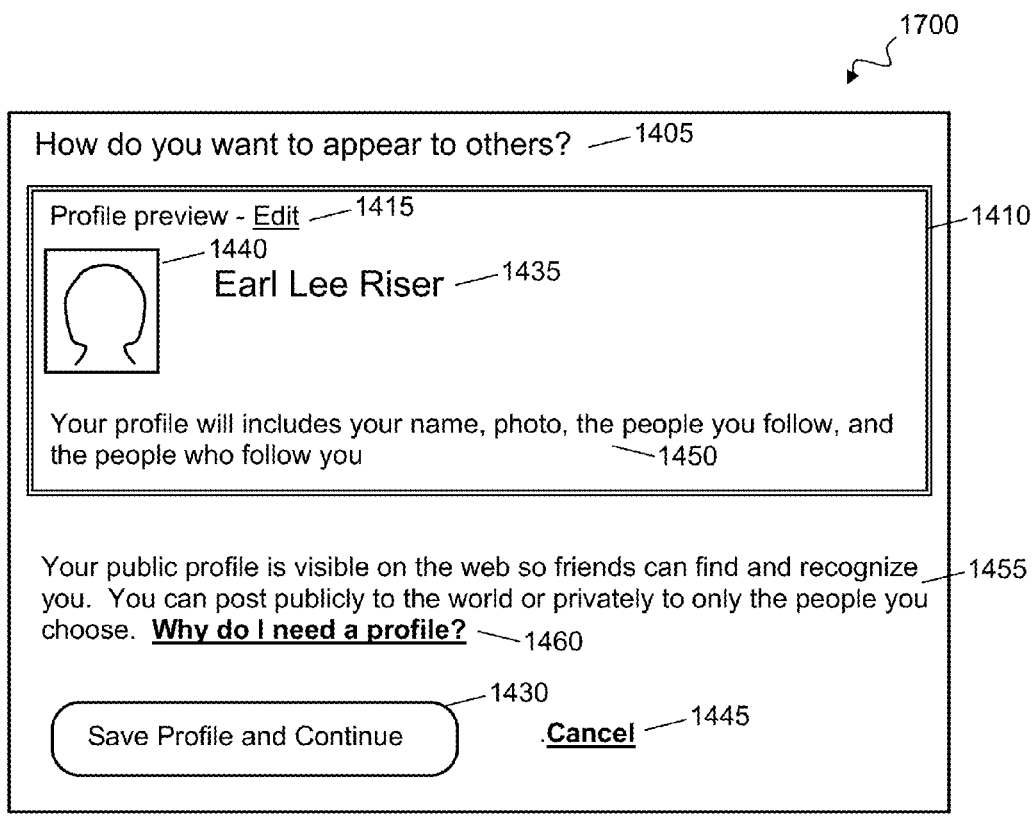

FIG. 17 is a schematic representation of a user interface 1700 that assists an individual in participating in a social network. User interface 1700 is a graphical presentation that can be displayed to an individual who is in the process of registering to become a member of the social network. For example, user interface 1700 can be displayed to an individual in response to receipt of a request from the individual to register as a new member in the social network. In some implementations, user interface 1700 can be displayed in response to user interaction with another user interface during registration as a new member. For example, user interface 1700 can be displayed in response to user interaction with done editing widget 1645 in user interface 1600 (FIG. 16) When user interface 1700 is displayed in the context of process 1300, user interface 1700 can be used to confirm both the profile information at block 1310 and the relationships at 1315 for an individual and to trigger the addition of the individual to the social network as a new member at block 1320 (FIG. 13).

In the illustrated implementation, user interface 1700 excludes relationship edit widgets 1420, 1425. The exclusion of relationship edit widgets 1420, 1425 indicates that information characterizing the member's relationships will be excluded from the individual's profile in the member network. The exclusion of information characterizing the member's relationships can be a default setting or can be responsive to user interaction with profile change widget 1610 in user interface 1600 (FIG. 16).

Figure 18:
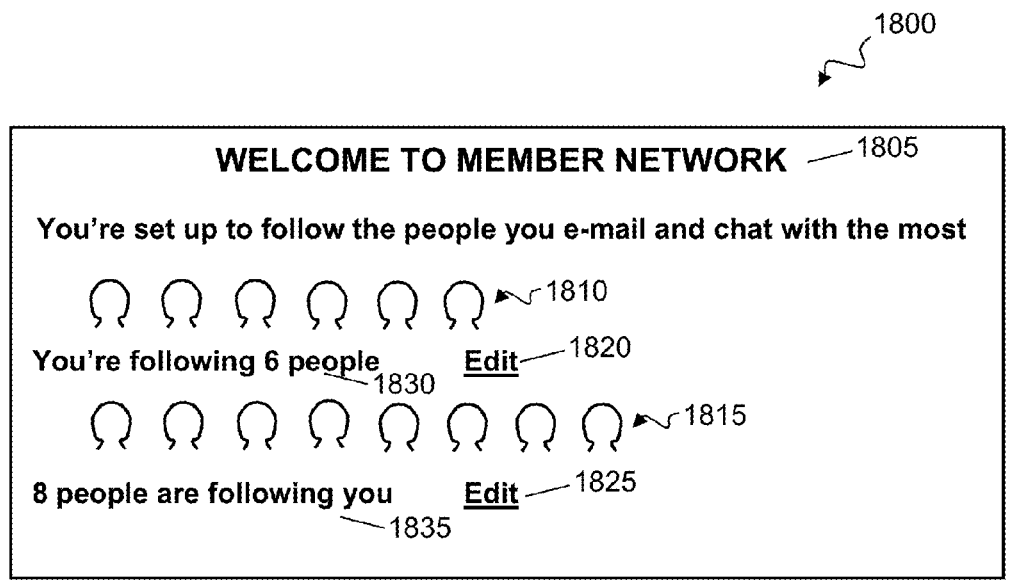

FIG. 18 is a schematic representation of a user interface 1800 that assists an individual in participating in a social network. User interface 1800 is a graphical presentation that can be displayed to an individual who has just registered as a member of the social network. For example, user interface 1800 can be displayed to an individual in response to user interaction with a widget that triggers the addition of the new member to the asymmetric social network, such as user interaction with confirmation widget 1430 (FIGS. 14-16). When user interface 1800 is displayed in the context of process 1300, user interface 1800 can be used to indicate that an individual has indeed been added to the social network as a new member at block 1320 (FIG. 13).

In the illustrated implementation, the social network is a single level asymmetric social network, i.e., with one class of followers. In other implementations, user interface 1800 can assists individual in participating in a different social network, such as a multi level asymmetric social network and a symmetric social network where bi-directionally equivalent relationships (e.g., relationships between friends) exist. In such implementations, user interface 1800 characterizes and allows an individual to change the relationships supported by the network.

User interface 1800 includes a text or other header 1805 welcoming the individual to the member network, one or more collections 1810, 1815 of information characterizing the new member's relationships in the member network, and one or more relationship change widgets 1820, 1825. In the illustrated implementation, relationship-characterizing information collection 1810 is a collection of images associated with those members that the new member is to follow. These images are identified as characterizing the members that the new member is to follow by description 1830. Relationship-characterizing information collection 1815 is a collection of images associated with those members that follow the new member. These images are identified as characterizing the members that follow the new member by description 1835.

Relationship change widget 1820 is an interactive element that, in response to user interaction, triggers the display of interactive elements for changing the members to be followed. For example, user interaction with relationship change widget 1820 can trigger the display of interactive elements that are each associated with respective information characterizing the member whom the new member is to follow and that, in response to user interaction, end the following relationship with the associated member.

Relationship change widget 1825 is an interactive element that, in response to user interaction, triggers the display of interactive elements for changing the members who follow the new member in the member network. For example, user interaction with relationship change widget 1825 can trigger the display of interactive elements that are each associated with respective information characterizing the members who follow the new member and that, in response to user interaction, end the relationship with the associated member.

In some implementations, user interface 1800 can also include a text box or other interactive element (not shown) that allows a user to author a post to the social network.

FIG. 19 is a flowchart of a process 1900 for assisting participation in a social network. Process 1900 can be performed by a device that includes one or more data processing devices that perform operations by executing one or more sets of machine-readable instructions to implement a social network. For example, process 1900 can be performed by server 155 in the context of one or both of systems 100, 400 (FIGS. 1, 4). Process 1900 can be performed in isolation or in conjunction with other digital data processing operations. For example, in some implementations, process 1900 can be performed in conjunction with process 500 (FIG. 5). As another example, in some implementations, process 1900 can be performed in conjunction with process 1300 (FIG. 13).

The device performing process 1900 receives a trigger for the establishment of a new relationship for a member in a member network at block 1905. The trigger can be, e.g., an affirmative request by the member that a new relationship be established, the passage of an amount of time, or a certain amount of activity in an electronic mail or chat message system. The trigger thus need not be received during registration of an individual as a new member but rather can be received outside of this context.

The device performing process 1900 generates one or more new relationship suggestions for the member at block 1910. In some implementations, the suggested new relationships can be relationships with members who are identified at block 515 in process 500 (FIG. 5). In some implementations, the relationships can be relationships in an asymmetric social network that establish the individual as a follower of other members in the asymmetric social network.

The device performing process 1900 presents the new relationship suggestion(s) to the member at block 1915. The new relationship suggestion can be presented on a display screen of a data processing device along with an interactive element that allows the member to explicitly or implicitly confirm that the suggested new relationship is indeed to be established.

The device performing process 1900 receives the member's confirmation of the new relationship at block 1920 and establishes the new relationship in the social network at block 1920. The confirmation of the relationships can be explicit or implicit. For example, the individual's failure to disapprove of the suggested relationship can be taken as a confirmation of the new relationship.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method performed by a system of one or more data processing devices, the method comprising:
    receiving, at the system, a historical record of message exchange between an individual and members in a social network, wherein for at least one of exchanged messages in the message exchange at least one of a recipient or a sender of the at least one of the exchanged messages in the historical record is not a member in the social network;
    the system determining, for at least one of the members, whether the individual is likely to want to be associated to the respective member in the social network, each determination considering a number and transactional characteristics of the message exchange between the individual and the respective member in the historical record, wherein determining whether the individual is likely to want to be associated to the respective member comprises determining a percent of the messages that were read by the individual from the messages sent by each of the respective members to the individual, wherein determining whether the individual is likely to want to be associated to the respective member further comprises considering timing of the messages exchanged between the individual and each of the respective members, wherein considering timing of the messages comprises:
        calculating an exponentially decaying value for each message of the messages exchanged between each of the respective members and the individual, wherein each exponentially decaying value is based on a time since each respective message was sent and a rate constant; and
        summing the exponentially decaying values for the messages exchanged between each of the respective members and the individual to obtain summed values; and
    the system outputting the determinations that the individual is likely to want to be associated to at least one of the respective members in the social network.

2. The method of claim 1, wherein:
    the method further comprises receiving, at the system from the individual, a request to register as a new member in the social network; and
    the determinations of whether the individual is likely to want to be associated to the respective member and the outputting of the determinations is done in response to the receipt of the request to register the individual and as part of a registration process.

3. The method of claim 1, wherein determining whether the individual is likely to want to be associated to the respective member comprises considering the number and transactional characteristics of both electronic mail messages and chat messages.

4. The method of claim 1, wherein:
    determining whether the individual is likely to want to be associated to the respective member comprises comparing a threshold with a probability that each of the respective members is a member to whom the individual is likely to want to be associated; and
    the method further comprises outputting identifiers of the members to whom the individual is likely to want to be associated to a display screen for confirmation by the individual.

5. A non-transitory computer storage medium encoded with a computer program, the program comprising instructions that when executed by one or more data processing devices cause the one or more data processing devices to perform operations, the operations comprising:
    receiving, from an individual, a request to register as a new member in a social network;
    responding to the request by causing to be displayed a user interface to the individual, the user interface including information characterizing at least one member in the social network to whom the individual is likely to want to be associated as a follower, wherein the information is determined using a historical record of message exchange between the individual and the at least one member in the social network when the individual was not a member of the social network and whether one or more of the messages sent by each of the respective at least one member to the individual were read by the individual, wherein the information is further determined by considering timing of the messages exchanged between the individual and each of the respective members, wherein considering timing of the messages comprises:
        calculating an exponentially decaying value for each message of the messages exchanged between each of the respective members and the individual, wherein each exponentially decaying value is based on a time since each respective message was sent and a rate constant; and
        summing the exponentially decaying values for the messages exchanged between each of the respective members and the individual to obtain summed values;
    confirming establishment of at least one follower relationship with the at least one member with the individual; and adding the individual to the social network, the addition including establishing the individual as a follower of the at least one member.

6. The non-transitory computer storage medium of claim 5, wherein confirming the at least one follower relationship further comprises implicitly confirming the at least one follower relationship by the individual's failure to request that the at least one follower relationship be changed.

7. The non-transitory computer storage medium of claim 5, wherein causing to be displayed the user interface further comprises causing a display of a preview of a profile of the individual in the social network and an interactive widget programmed to change the profile in response to user interaction.

8. The non-transitory computer storage medium of claim 7, wherein causing to be displayed the user interface further comprises causing a display of an identifier of the individual and an image associated with the individual in the preview.

9. The non-transitory computer storage medium of claim 5, wherein causing to be displayed the user interface further comprises causing a display of information characterizing members in the social network who follow the individual.

10. The non-transitory computer storage medium of claim 5, wherein causing to be displayed the user interface further comprises causing a display of an interactive widget programmed to end the following of one or more of the at least one member in the social network in response to user interaction.

11. The non-transitory computer storage medium of claim 5, wherein the individual is added to the social network in response to user interaction with a widget that confirms the establishment of the at least one follower relationship.

12. The non-transitory computer storage medium of claim 11, wherein adding the individual to the social network further comprises responding to the user interaction with the widget that confirms the establishment of the at least one follower relationship by displaying a second user interface, the second user interface including a text box programmed to receive user input authoring a post to the social network.

13. The method of claim 1, wherein receiving a historical record of message exchange comprises receiving a historical record of electronic mail and chat message exchange.

14. The method of claim 1, wherein determining whether the individual is likely to want to be associated to the respective member further comprises multiplying the percent of the messages that were read by the individual by a first weight, wherein the first weight is a correlation coefficient that embodies the correlation between reading of messages and existence of relationships between members.

15. The method of claim 1, wherein considering timing of the messages further comprises normalizing the summed exponentially decaying values by multiplying each of the summed values by a total number of messages exchanged by the individual.

16. The method of claim 1, wherein determining whether the individual is likely to want to be associated to the respective member further comprises:
  inverting each of the summed values; and
  multiplying each of the inverted summed values by a second weight, wherein the second weight is derived from statistical analysis of behavior of other members in the social network, wherein the other members exclude the individual.

17. The method of claim 4, wherein the threshold is one of: a first threshold for the individual and the member to be publicly associated and a second threshold for the individual to be a selected follower of the member.

18. A social network server to assist participation in a social network, the social network server comprising:
  one or more hardware digital data processing devices coupled over one or more data links to one or more data storage devices that store databases comprising member information that characterizes members in an asymmetric social network and one or more of:
    historical record of exchange of chat messages between first individuals, wherein two or more of the first individuals are members in the asymmetric social network; and
    historical record of exchange of electronic mail messages between second individuals, wherein two or more of the second individuals are members in the asymmetric social network,
  the social network server configured in accordance with machine-readable instructions, wherein the instructions when executed by the social network server, cause the social network server to perform operations comprising:
    accessing, over the one or more data links, at least one of: the historical record of exchange of chat messages and the historical record of exchange of electronic mail messages, to retrieve messages exchanged between a particular individual and a first member in the asymmetric social network, wherein the particular individual is not a member of the asymmetric social network;
    determining, whether the individual is likely to want to be associated to the first member in the asymmetric social network, wherein the determining comprises:
      calculating a first parameter, wherein the first parameter is equal to a number of the messages exchanged between the particular individual and the first member;
      multiplying the first parameter by a first weight;
      calculating a second parameter, wherein the second parameter is a ratio of messages sent by the first member to the individual that were read by the individual to the messages sent by the first member to the individual;
      multiplying the second parameter by a second weight;
  summing the first parameter and the second parameter to generate a composite value, and
  wherein the determining whether the individual is likely to want to be associated to the first member further comprises considering timing of the messages exchanged between the individual and the first member, wherein considering timing of the messages comprises:
    calculating an exponentially decaying value for each message of the messages exchanged between the first member and the individual, wherein each exponentially decaying value is based on a time since each respective message was sent and a rate constant; and
    summing the exponentially decaying values for the messages exchanged between the first member and the individual to obtain summed values; and
    determining that the composite value meets a threshold value based on a comparison of the composite value and the threshold value;
    based on a determination that the composite value meets the threshold, outputting to a display screen for review by the individual, an identification of the member of the asymmetric social network.

19. The social network server of claim 18, wherein the operation of causing an output to the display screen the identification of the member of the asymmetric network comprises subscribing the individual as a follower of the member in the asymmetric social network.

\* \* \* \* \*